US010117105B2

(12) United States Patent
Li

(10) Patent No.: US 10,117,105 B2
(45) Date of Patent: Oct. 30, 2018

(54) NETWORK CONTROLLER, STATION, AND METHOD FOR ESTABLISHING GUARD PERIOD

(71) Applicant: Huawei Technologies Co., Ltd., Shenzhen (CN)

(72) Inventor: Dejian Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 70 days.

(21) Appl. No.: 15/199,597

(22) Filed: Jun. 30, 2016

(65) Prior Publication Data

US 2016/0316375 A1 Oct. 27, 2016

Related U.S. Application Data

(63) Continuation of application No. PCT/CN2013/091184, filed on Dec. 31, 2013.

(51) Int. Cl.
*H04W 16/14* (2009.01)
*H04W 72/12* (2009.01)
(Continued)

(52) U.S. Cl.
CPC .......... *H04W 16/14* (2013.01); *H04B 7/0617* (2013.01); *H04W 72/1226* (2013.01);
(Continued)

(58) Field of Classification Search
None
See application file for complete search history.

(56) References Cited

U.S. PATENT DOCUMENTS 8,351,954 B2   1/2013 Chu et al.
2005/0099942 A1*  5/2005 Kurihara ............... H04W 64/00
370/229

(Continued)

FOREIGN PATENT DOCUMENTS

CN    1592147 A    3/2005
CN   101803262 A    8/2010
(Continued)

OTHER PUBLICATIONS

IEEE, "Part 11: Wireless LAN Medium Access Control (MAC) and Physical Layer (PHY) Specifications, Amendment 3: Enhancements for Very High Throughput in the 60 GHz Band," IEEE Std 802.11ad™—2012, IEEE Standards Association, 628 pages, Dec. 28, 2012, New York.

(Continued)

*Primary Examiner* — Eunsook Choi
(74) *Attorney, Agent, or Firm* — Slater Matsil, LLP

(57) ABSTRACT

A network controller includes: an acquiring unit, configured to acquire scheduling information of an adjacent network controller of a first network controller; a determining unit, configured to determine a status of time and frequency overlapping between another access period and a first SP; a scheduling unit, configured to set guard period configuration information of the first SP according to an interfered status of the first SP and the overlapping status determined by the determining unit; and a first sending unit, configured to send the guard period configuration information of the first SP to a station.

22 Claims, 11 Drawing Sheets

(51) Int. Cl.
*H04B 7/06* (2006.01)
*H04W 74/08* (2009.01)
*H04W 88/08* (2009.01)
*H04W 88/12* (2009.01)

(52) U.S. Cl.
CPC ... *H04W 72/1263* (2013.01); *H04W 74/0816* (2013.01); *H04W 88/08* (2013.01); *H04W 88/12* (2013.01)

(56) References Cited

U.S. PATENT DOCUMENTS

| | | | |
|---|---|---|---|
| 2006/0285527 A1* | 12/2006 | Gao | H04W 52/0216 370/338 |
| 2008/0075039 A1 | 3/2008 | Srinivas et al. | |
| 2011/0075642 A1 | 3/2011 | Cordeiro et al. | |
| 2011/0110340 A1 | 5/2011 | Lakkis | |
| 2014/0079016 A1* | 3/2014 | Dai | H04L 5/0041 370/330 |
| 2015/0043409 A1* | 2/2015 | Choi | H04W 52/0216 370/311 |
| 2016/0270079 A1* | 9/2016 | Seok | H04W 74/04 |

FOREIGN PATENT DOCUMENTS

| | | |
|---|---|---|
| CN | 103024891 A | 4/2013 |
| CN | 103118406 A | 5/2013 |
| EP | 2375664 A1 | 10/2011 |
| WO | 2009025480 A1 | 2/2009 |
| WO | 2009072962 A1 | 6/2009 |

OTHER PUBLICATIONS

IEEE, "Part 11: Wireless LAN Medium Access Control (MAC) and Physical Layer (PHY) Specifications," IEEE Std 802.11™—2012, IEEE Standards Association, 2793 pages, Mar. 29, 2012, New York.

Qian Chen, et al., "Directional Cooperative MAC Protocol Design and Performance Analysis for IEEE 802.11ad WLANs," IEEE Transactions on Vehicular Technology, Jul. 2013, pp. 2667-2677, vol. 62, No. 6.

* cited by examiner

| B0 B3 | B4 B6 | B7 | B8 | B9 | B10 | B11 | B12 B15 |
|---|---|---|---|---|---|---|---|
| Allocation ID | Allocation type | Pseudo-static | Truncatable | Extendable | PCP active | Low-power single carrier used | Reserved |
| Bits: 4 | 3 | 1 | 1 | 1 | 1 | 1 | 4 |

FIG. 5A

| B0 B3 | B4 B6 | B7 | B8 | B9 | B10 | B11 | B12 | B13 B14 | B15 |
|---|---|---|---|---|---|---|---|---|---|
| Allocation ID | Allocation type | Pseudo-static | Trunca-table | Exten-dable | PCP active | Low-power single carrier used | Truncation type | Guard period | Reserved |
| Bits: 4 | 3 | 1 | 1 | 1 | 1 | 1 | 1 | 1 | 1 |

FIG. 5B

NETWORK CONTROLLER, STATION, AND METHOD FOR ESTABLISHING GUARD PERIOD

CROSS-REFERENCE TO RELATED APPLICATIONS

This application is a continuation of International Application No. PCT/CN2013/091184, filed on Dec. 31, 2013, which is hereby incorporated by reference in its entirety.

TECHNICAL FIELD

The present disclosure relates to the field of communications, and in particular embodiments, to a network controller, a station, and a method for establishing a guard period.

BACKGROUND

60 GHz and 45 GHz wireless communications fall in the category of millimeter wave communications. A millimeter wave refers to an electromagnetic wave at a frequency of 300 GHz to 30 GHz and with a wavelength of 1 to 10 mm, and is widely applied to many fields such as communications, radar, navigation, remote sensing, and radio astronomy. As an important branch of millimeter wave communications, the 60 GHz and 45 GHz communications have the following advantages.

Large channel capacity. Bandwidth of 60 GHz and 45 GHz frequency bands is a relatively large license-free frequency band. License-free bandwidth exceeding 5 GHz enables a 60 GHz technology to have great potential in capacity and flexibility, and enables the 60 GHz technology to have a Gbit-level wireless application prospect. In addition, spectrum management allows the 60 GHz technology to have much larger transmit power than other existing wireless local area network (WLAN) and wireless personal area network communication technologies (WPAN), so that a path loss of the 60 GHz frequency band can be overcome.

Good directivity, and strong security and confidentiality. Under a same antenna size, the millimeter wave has a much narrower beam than a microwave. Therefore, 60 GHz and 45 GHz radio waves have good directivity, and fit well for point-to-point short range communications.

Good international adaptability. Countries such as European countries, the United States, and Japan specify in succession continuous license-free spectrum resources within a range of 57 GHz to 66 GHz. Spectra of the countries are allocated to bandwidth nearby 60 GHz, where there is a common frequency of about 5 GHz. Therefore, 60 GHz wireless communications products have good international adaptability.

60 GHz and 45 GHz wireless communications technologies can provide transmission at a multi-gigabit rate to support high-definition video transmission, fast synchronization, a wireless USB, and a high-speed wireless local area network.

A wireless local area network may be a basic service set (BSS) including a wireless access device, or may be a BSS including no wireless access device (un-infrastructure BSS). The wireless local area network generally includes a network controller and a station. The network controller provides, by using a directional multi-gigabit beacon frame (DMG Beacon) or an announcement frame, a station with a channel access period allocation service, such as a service period (SP) and a contention-based access period (CBAP). Different from a conventional 802.11 Beacon frame, the DMG Beacon frame is dedicated to BSSs at the 60 GHz and 45 GHz frequency bands, and has functions such as network synchronization, beamforming training, and SP and CBAP allocation. In the BSS, time is generally divided into time intervals with a beacon interval (BI) as a period, where each BI includes some channel access periods. Referring to FIG. 1, which is a schematic diagram of access periods within a BI, a beacon transmission interval (BTI) is a transmission interval of a DMG Beacon directional multi-gigabit beacon frame. Association beamforming training (A-BFT) is a beamforming training period when association is performed between the network controller and a newly accessed station. An announcement transmission interval (ATI) is a request/answer-based round-robin management access period between the network controller and the station. A data transfer interval (DTI) is a data sending period, where the DTI is divided into any combination of CBAP and SP time periods by means of scheduling by the network controller, the CBAP is a contention-based access period, and the SP is a dedicated service period.

When allocating the SP and the CBAP within the DTI, the network controller needs to perform scheduling to avoid interference. Because a beamforming-based directional transmission technology is used, 802.11ad allows overlapping between different SPs allocated to different stations within a BSS. An overlapped SP can improve spatial sharing and multiplexing within the BSS. However, when a reserved SP overlaps with another SP, the reserved SP may be interfered by an adjacent BSS or a current BSS. Interference can be avoided by establishing a guard period for an SP.

However, in the prior art, it is required that a station of an SP needs to establish a guard period only in a case in which a network controller joins a centralized cluster. If the network controller does not join a centralized cluster, the station of the SP itself determines whether to establish a guard period for the SP, but the station of the SP cannot effectively determine when the guard period should be established. As a result, protection overheads increase due to blind establishment of guard periods, and interference is caused when no guard period is established due to missing scheduling information of an adjacent BSS.

SUMMARY

Embodiments of the present invention provide a network controller, a station, and a method for establishing a guard period, so that when scheduling an SP, a network controller determines whether a guard period should be established for the SP, and gives an indication to a station of the SP, which not only reduces protection overheads of establishing the guard period, but also effectively decreases intra-BSS or inter-BSS interference.

To achieve the foregoing objective, the following technical solutions are used in the embodiments of the present invention.

According to a first aspect, a network controller is provided, including the following.

An acquiring unit, configured to acquire scheduling information of an adjacent network controller of a first network controller, where scheduling information of a network controller includes an identifier of an access period scheduled by the corresponding network controller, and a start time and duration of the access period corresponding to the identifier of the access period, where the access period includes a service period SP and a contention-based access period CBAP.

A determining unit, configured to determine, according to scheduling information of the first network controller and the scheduling information, acquired by the acquiring unit, of the adjacent network controller, a status of time and frequency overlapping between a first SP and another access period, except the first SP, scheduled by the first network controller and the adjacent network controller.

A scheduling unit, configured to set guard period configuration information of the first SP according to a pre-acquired interfered status of the first SP and the status, determined by the determining unit, of time and frequency overlapping between the first SP and the another access period, except the first SP, scheduled by the first network controller and the adjacent network controller, where the guard period configuration information includes first indication information or second indication information, the first indication information is used to indicate that a guard period needs to be established for the first SP, and the second indication information is used to indicate that the guard period is allowed to be established for the first SP.

A first sending unit, configured to send the guard period configuration information, configured by the scheduling unit, of the first SP to a source station and a destination station of the first SP, so that the source station and the destination station of the first SP determine, according to the guard period configuration information of the first SP, whether to establish the guard period for the first SP.

In an implementation of the first aspect, the scheduling unit being configured to set the guard period configuration information of the first SP according to the pre-acquired interfered status of the first SP and the status, determined by the determining unit, of time and frequency overlapping between the first SP and the another access period, except the first SP, scheduled by the first network controller and the adjacent network controller includes the following.

If the determining unit determines (e.g. in response to the determining unit determining) that time and frequency overlapping exists between a first access period and the first SP in the another access period, except the first SP, scheduled by the first network controller and the adjacent network controller, and cannot determine, according to the pre-acquired interfered status of the first SP, that the first access period causes no interference to the first SP, setting the guard period configuration information of the first SP to the first indication information.

If the determining unit determines that no time and frequency overlapping exists between a first access period and the first SP in the another access period, except the first SP, scheduled by the first network controller and the adjacent network controller, setting the guard period configuration information of the first SP to the second indication information.

If the determining unit determines that time and frequency overlapping exists between a first access period and the first SP in the another access period, except the first SP, scheduled by the first network controller and the adjacent network controller, and determines, according to the pre-acquired interfered status of the first SP, that the first access period causes no interference to the first SP, setting the guard period configuration information of the first SP to the second indication information.

In an implementation of the first aspect, the scheduling information further includes an allocation type of the access period, and the allocation type indicates a type of the access period and an allocated channel; and the first indication information includes any one of third indication information, or fourth indication information, or fifth indication information, so that the source station and the destination station of the first SP determine, according to the first indication information of the first SP, a channel on which the guard period established. Correspondingly, that the scheduling unit sets the guard period configuration information of the first SP to the first indication information includes the following.

If it is determined that a channel of the first SP is the same as a channel of the first access period, setting the first indication information of the first SP to the third indication information, where the third indication information is used to instruct the source station and the destination station of the first SP to establish the guard period only on a current working channel.

If it is determined that a channel of the first SP is a small-bandwidth channel, and a channel of the first access period is a large-bandwidth channel whose frequency overlaps with a frequency of the small-bandwidth channel of the first SP, setting the first indication information of the first SP to the fourth indication information, where the fourth indication information is used to instruct the source station and the destination station of the first SP to establish the guard period on a current working small-bandwidth channel, and establish the guard period on a large-bandwidth channel whose frequency overlaps with a current working small-bandwidth frequency.

If it is determined that a channel of the first SP is a large-bandwidth channel, and a channel of the first access period is a low-frequency small-bandwidth channel whose frequency overlaps with a frequency of the large-bandwidth channel of the first SP, setting the first indication information of the first SP to the fourth indication information, where the fourth indication information is used to instruct the source station and the destination station of the first SP to establish the guard period on a current working large-bandwidth channel, and establish the guard period on a low-frequency small-bandwidth channel whose frequency overlaps with a frequency of the current working large-bandwidth channel.

If it is determined that a channel of the first SP is a large-bandwidth channel, and a channel of the first access period is a high-frequency small-bandwidth channel whose frequency overlaps with a frequency of the large-bandwidth channel of the first SP, setting the first indication information of the first SP to the fifth indication information, where the fifth indication information is used to instruct the source station and the destination station of the first SP to establish the guard period on a current working large-bandwidth channel, and establish the guard period on a high-frequency small-bandwidth channel whose frequency overlaps with a frequency of the current working large-bandwidth channel.

In an implementation of the first aspect, the acquiring unit is configured to receive the scheduling information sent by the adjacent network controller of the first network controller; or receive interference report information that is sent, by using a cluster report or a DMG service specification element, by a station within a basic service set BSS in which the first network controller is located; and acquire the scheduling information of the adjacent network controller according to the interference report information.

In an implementation of the first aspect, the guard period configuration information is expressed by using a guard period field or an allocation type field that is added in an extended scheduling element. Correspondingly, the first sending unit is further configured to send an extended scheduling element of the first SP to the source station and the destination station of the first SP, where the extended scheduling element of the first SP includes the guard period configuration information of the first SP.

In an implementation of the first aspect, the network controller further includes: a second sending unit, configured to send the scheduling information of the first network controller to the adjacent network controller of the first network controller, so that the adjacent network controller of the first network controller configures, according to the scheduling information of the first network controller, the scheduling information of the adjacent network controller, and a status, pre-acquired by the adjacent network controller, of interference between access periods, guard period configuration information of an SP scheduled by the adjacent network controller.

In an implementation of the first aspect, the scheduling unit is further configured to: if it is determined that guard periods need to be established for SPs that are respectively allocated to a first pair of stations and a second pair of stations, according to an allocation status of the SPs corresponding to the first pair of stations and the second pair of stations, set directional channel quality measurement request elements and send the directional channel quality measurement request elements to the first pair of stations and the second pair of stations respectively, so that directional channel quality measurement time periods indicated by the directional channel quality measurement request elements of the first pair of stations and the second pair of stations can cover listening mode time periods at start times of the corresponding SPs, and further the first pair of stations and the second pair of stations respectively point receive antennas to peer stations according to the directional channel quality measurement request elements, and complete directional channel quality measurement while channel listening required for establishing the guard periods is complete within the corresponding SPs.

In an implementation of the first aspect, the acquiring unit is further configured to receive directional channel measurement results reported by the first pair of stations and the second pair of stations by using directional channel quality measurement report elements. The scheduling unit is further configured to: if it is determined, according to the measurement results, that no mutual interference exists when the first pair of stations communicates with the second pair of stations, determine that time-overlapped SPs are allocated to the first pair of stations and the second pair of stations at the beginning of a next BI of a current beacon interval BI.

According to a second aspect, a station is provided, including the following. A first receiving unit, configured to receive guard period configuration information, sent by a first network controller, of a first SP, where the guard period configuration information includes first indication information or second indication information, the first indication information is used to indicate that a guard period needs to be established for the first SP, and the second indication information is used to indicate that the guard period is allowed to be established for the first SP. The station also includes an establishing unit, configured to determine, according to the guard period configuration information, received by the first receiving unit, of the first SP, whether to establish the guard period for the first SP.

In an implementation of the second aspect, the station further includes the following. A second receiving unit, configured to receive scheduling information sent by an adjacent network controller of the first network controller, where the scheduling information of the adjacent network controller includes an identifier of an access period scheduled by the adjacent network controller, a start time and duration of the access period corresponding to the identifier of the access period, and a channel type of the access period, where the access period includes a service period SP and a contention-based access period CBAP. The station further includes a sending unit, configured to send interference report information to the first network controller by using a cluster report or a DMG service specification element, where the interference report information includes the scheduling information sent by the adjacent network controller.

In an implementation of the second aspect, if the guard period configuration information received by the first receiving unit is the second indication information, the first network controller belongs to a first cluster, and the first SP is allocated to the $n^{th}$ cluster time interval (ClusterTimeInter), the second receiving unit receiving the scheduling information sent by the adjacent network controller of the first network controller includes the second receiving unit receives the scheduling information of the adjacent network controller within each beacon service period (Beacon SP) by using a cluster mechanism.

In an implementation of the second aspect, the establishing unit is configured to perform the following.

If the guard period configuration information is the first indication information, establish the guard period for the first SP.

If the guard period configuration information is the second indication information, and if it is determined, according to the scheduling information of the adjacent network controller received by the second receiving unit, that time and frequency overlapping exists between a second access period and the first SP, and it cannot be determined that the second access period causes no interference to the first SP, establish the guard period for the first SP.

If the guard period configuration information is the second indication information, and if it is determined, according to the scheduling information of the adjacent network controller received by the second receiving unit, that no time and frequency overlapping exists between a third SP and the first SP, skip establishing the guard period for the first SP.

If the guard period configuration information is the second indication information, and if it is determined, according to the scheduling information of the adjacent network controller received by the second receiving unit, that time and frequency overlapping exists between a second access period and the first SP, and it cannot be determined that the second access period causes no interference to the first SP, establish the guard period for the first SP.

In an implementation of the second aspect, the first indication information includes any one of third indication information, or fourth indication information, or fifth indication information. Correspondingly, the establishing unit establishing the guard period for the first SP includes the following.

If the first indication information of the first SP is the third indication information, establishing the guard period only on a current working channel.

If the first indication information of the first SP is the fourth indication information and the station works on a small-bandwidth channel, establishing the guard period on a current working small-bandwidth channel of the station, and establishing the guard period on a large-bandwidth channel whose frequency overlaps with a current working small-bandwidth frequency.

If the first indication information of the first SP is the fourth indication information and the station works on a large-bandwidth channel, establishing the guard period on a current working large-bandwidth channel of the station, and establishing the guard period on a low-frequency small-bandwidth channel whose frequency overlaps with a frequency of the current working large-bandwidth channel.

If the first indication information of the first SP is the fifth indication information, establishing the guard period on a current working large-bandwidth channel, and establishing the guard period on a high-frequency small-bandwidth channel whose frequency overlaps with a frequency of the current working large-bandwidth channel.

In an implementation of the second aspect, the establishing unit establishing the guard period only on the current working channel includes listening on the current working channel only; and if both a physical layer carrier sensing (CS) result and a virtual carrier sensing result show that the current working channel is idle, performing RTS/DMG CTS handshake on the current working channel.

In an implementation of the second aspect, the establishing unit establishing the guard period on the current working small-bandwidth channel of the station, and establishing the guard period on the large-bandwidth channel whose frequency overlaps with the current working small-bandwidth frequency includes listening on the current working small-bandwidth channel of the station. If both a physical layer carrier sensing (CS) result and a virtual carrier sensing result show that the current working small-bandwidth channel is idle, performing RTS/DMG CTS handshake on the current working small-bandwidth channel; and performing RTS/DMG CTS handshake on the large-bandwidth channel whose frequency overlaps with the current working small-bandwidth frequency.

In an implementation of the second aspect, that the establishing unit establishes the guard period on the current working large-bandwidth channel of the station, and establishes the guard period on the low-frequency small-bandwidth channel whose frequency overlaps with the frequency of the current working large-bandwidth channel includes: listening on the current working large-bandwidth channel of the station. If both a physical layer carrier sensing (CS) result and a virtual carrier sensing result show that the current working large-bandwidth channel of the station is idle, performing RTS/DMG CTS handshake on the current working large-bandwidth channel of the station; and after the RTS/DMG CTS handshake interaction performed on the current working large-bandwidth channel of the station is complete, performing RTS/DMG CTS handshake on the low-frequency small-bandwidth channel whose frequency overlaps with the frequency of the current working large-bandwidth channel.

In an implementation of the second aspect, that the establishing unit establishes the guard period on the current working large-bandwidth channel, and establishes the guard period on the high-frequency small-bandwidth channel whose frequency overlaps with the frequency of the current working large-bandwidth channel includes listening on the current working large-bandwidth channel of the station. If both a physical layer carrier sensing (CS) result and a virtual carrier sensing result show that the current working large-bandwidth channel of the station is idle, performing RTS/DMG CTS handshake on the current working large-bandwidth channel of the station; and after the RTS/DMG CTS handshake interaction performed on the current working large-bandwidth channel of the station is complete, performing RTS/DMG CTS handshake on the high-frequency small-bandwidth channel whose frequency overlaps with the frequency of the current working large-bandwidth channel.

In an implementation of the second aspect, the guard period configuration information is expressed by using a guard period field or an allocation type field that is added in an extended scheduling element. Correspondingly, the first receiving unit is further configured to receive an extended scheduling element, sent by the first network controller, of the first SP, where the extended scheduling element of the first SP includes the guard period configuration information of the first SP.

In an implementation of the second aspect, the first receiving unit is further configured to receive a directional channel quality measurement request element sent by the first network controller, where a directional channel quality measurement time period indicated by the directional channel quality measurement request element covers a listening mode time period of an SP of the station, and channel measurement and channel listening are complete at the same time within the measurement time period. The establishing unit is further configured to point a receive antenna to a peer station according to the directional channel quality measurement request element, and complete directional channel quality measurement while channel listening required for establishing a guard period is complete within the corresponding SP.

In an implementation of the second aspect, the establishing unit is further configured to: if both the physical layer carrier sensing (CS) result and the virtual carrier sensing result show that a channel is idle, directly perform RTS/DMG CTS handshake after the directional channel quality measurement time period indicated by the directional channel quality measurement request element ends.

In an implementation of the second aspect, the sending unit is further configured to send a directional channel quality measurement result to the first network controller by using the directional channel quality measurement report element, so that if determining, according to the measurement result, that no mutual interference exists between SPs of a first pair of stations and a second pair of stations, the first network controller determines that time-overlapped SPs are allocated to the first pair of stations and the second pair of stations within a next BI of a current beacon interval BI.

According to a third aspect, a method for establishing a guard period is provided, including the following.

Acquiring, by a first network controller, scheduling information of an adjacent network controller of the first network controller, where scheduling information of a network controller includes an identifier of an access period scheduled by the corresponding network controller, and a start time and duration of the access period corresponding to the identifier of the access period, where the access period includes a service period (SP) and a contention-based access period (CBAP).

Determining, by the first network controller according to scheduling information of the first network controller and the scheduling information of the adjacent network controller, a status of time and frequency overlapping between a first SP and another access period, except the first SP, scheduled by the first network controller and the adjacent network controller.

Setting, by the first network controller, guard period configuration information of the first SP according to a pre-acquired interfered status of the first SP and the status of time and frequency overlapping between the first SP and the another access period, except the first SP, scheduled by the first network controller and the adjacent network controller, where the guard period configuration information includes first indication information or second indication information, the first indication information is used to indicate that a guard period needs to be established for the first SP, and the second indication information is used to indicate that the guard period is allowed to be established for the first SP.

Sending, by the first network controller, the guard period configuration information of the first SP to a source station and a destination station of the first SP, so that the source station and the destination station of the first SP determine, according to the guard period configuration information of the first SP, whether to establish the guard period for the first SP.

In an implementation of the third aspect, the setting, by the first network controller, guard period configuration information of the first SP according to a pre-acquired interfered status of the first SP and the status of time and frequency overlapping between the first SP and the another access period, except the first SP, scheduled by the first network controller and the adjacent network controller includes the following.

If it is determined that time and frequency overlapping exists between a first access period and the first SP in the another access period, except the first SP, scheduled by the first network controller and the adjacent network controller, and it cannot be determined, according to the pre-acquired interfered status of the first SP, that the first access period causes no interference to the first SP, setting the guard period configuration information of the first SP to the first indication information.

If it is determined that no time and frequency overlapping exists between a first access period and the first SP in the another access period, except the first SP, scheduled by the first network controller and the adjacent network controller, setting the guard period configuration information of the first SP to the second indication information.

If it is determined that time and frequency overlapping exists between a first access period and the first SP in the another access period, except the first SP, scheduled by the first network controller and the adjacent network controller, and it is determined, according to the pre-acquired interfered status of the first SP, that the first access period causes no interference to the first SP, setting the guard period configuration information of the first SP to the second indication information.

In an implementation of the third aspect, the scheduling information further includes an allocation type of the access period, and the allocation type indicates a type of the access period and an allocated channel; and the first indication information includes any one of third indication information, or fourth indication information, or fifth indication information, so that the source station and the destination station of the first SP determine, according to the first indication information of the first SP, a channel on which the guard period established. Correspondingly, the setting the guard period configuration information of the first SP to the first indication information includes the following. If it is determined that a channel of the first SP is the same as a channel of the first access period, setting the first indication information of the first SP to the third indication information, where the third indication information is used to instruct the source station and the destination station of the first SP to establish the guard period only on a current working channel.

If it is determined that a channel of the first SP is a small-bandwidth channel, and a channel of the first access period is a large-bandwidth channel whose frequency overlaps with a frequency of the small-bandwidth channel of the first SP, setting the first indication information of the first SP to the fourth indication information, where the fourth indication information is used to instruct the source station and the destination station of the first SP to establish the guard period on a current working small-bandwidth channel, and establish the guard period on a large-bandwidth channel whose frequency overlaps with a current working small-bandwidth frequency.

If it is determined that a channel of the first SP is a large-bandwidth channel, and a channel of the first access period is a low-frequency small-bandwidth channel whose frequency overlaps with a frequency of the large-bandwidth channel of the first SP, setting the first indication information of the first SP to the fourth indication information, where the fourth indication information is used to instruct the source station and the destination station of the first SP to establish the guard period on a current working large-bandwidth channel, and establish the guard period on a low-frequency small-bandwidth channel whose frequency overlaps with a frequency of the current working large-bandwidth channel.

If it is determined that a channel of the first SP is a large-bandwidth channel, and a channel of the first access period is a high-frequency small-bandwidth channel whose frequency overlaps with a frequency of the large-bandwidth channel of the first SP, setting the first indication information of the first SP to the fifth indication information, where the fifth indication information is used to instruct the source station and the destination station of the first SP to establish the guard period on a current working large-bandwidth channel, and establish the guard period on a high-frequency small-bandwidth channel whose frequency overlaps with a frequency of the current working large-bandwidth channel.

In an implementation of the third aspect, the acquiring, by a first network controller, scheduling information of an adjacent network controller of the first network controller includes: receiving, by the first network controller, the scheduling information sent by the adjacent network controller of the first network controller; or receiving, by the first network controller, interference report information that is sent, by using a cluster report or a DMG service specification element, by a station within a basic service set BSS in which the first network controller is located. This implementation further includes acquiring the scheduling information of the adjacent network controller according to the interference report information.

In an implementation of the third aspect, the guard period configuration information is expressed by using a guard period field or an allocation type field that is added in an extended scheduling element. Correspondingly, the sending, by the first network controller, the guard period configuration information of the first SP to a source station and a destination station of the first SP includes: sending, by the first network controller, an extended scheduling element of the first SP to the source station and the destination station of the first SP, where the extended scheduling element of the first SP includes the guard period configuration information of the first SP.

In an implementation of the third aspect, the method further includes: sending, by the first network controller, the scheduling information of the first network controller to the adjacent network controller of the first network controller, so that the adjacent network controller of the first network controller configures, according to the scheduling information of the first network controller, the scheduling information of the adjacent network controller, and a status, pre-acquired by the adjacent network controller, of interference between access periods, guard period configuration information of an SP scheduled by the adjacent network controller.

In an implementation of the third aspect, the method further includes the following. In response to a determination that guard periods need to be established for SPs that are respectively allocated to a first pair of stations and a second pair of stations, according to an allocation status of the SPs corresponding to the first pair of stations and the second pair of stations, setting directional channel quality measurement request elements and sending the directional channel quality measurement request elements to the first pair of stations and the second pair of stations respectively, so that directional channel quality measurement time periods indicated by the directional channel quality measurement request elements of the first pair of stations and the second pair of stations can cover listening mode time periods at start times of the corresponding SPs, and further the first pair of stations and the second pair of stations respectively point receive antennas to peer stations according to the directional channel quality measurement request elements, and complete directional channel quality measurement while channel listening required for establishing the guard periods is complete within the corresponding SPs.

In an implementation of the third aspect, the method further includes receiving directional channel measurement results reported by the first pair of stations and the second pair of stations by using directional channel quality measurement report elements. In response to a determination, according to the measurement results, that no mutual interference exists when the first pair of stations communicates with the second pair of stations, determining that time-overlapped SPs are allocated to the first pair of stations and the second pair of stations at the beginning of a next BI of a current beacon interval BI.

According to a fourth aspect, a method for establishing a guard period is provided, including: receiving guard period configuration information, sent by a first network controller, of a first SP, where the guard period configuration information includes first indication information or second indication information, the first indication information is used to indicate that a guard period needs to be established for the first SP, and the second indication information is used to indicate that the guard period is allowed to be established for the first SP; and determining, according to the guard period configuration information of the first SP, whether to establish the guard period for the first SP.

In an implementation of the fourth aspect, the method further includes receiving scheduling information sent by an adjacent network controller of the first network controller, where the scheduling information of the adjacent network controller includes an identifier of an access period scheduled by the adjacent network controller, a start time and duration of the access period corresponding to the identifier of the access period, and a channel type of the access period, where the access period includes a service period SP and a contention-based access period CBAP. The method further includes sending interference report information to the first network controller by using a cluster report or a DMG service specification element, where the interference report information includes the scheduling information sent by the adjacent network controller.

In an implementation of the fourth aspect, the receiving scheduling information sent by an adjacent network controller of the first network controller includes the following. In response to the guard period configuration information being the second indication information, the first network controller belongs to a first cluster, and the first SP is allocated to the $n^{th}$ cluster time interval, receiving the scheduling information of the adjacent network controller within each beacon service period (Beacon SP) by using a cluster mechanism.

In an implementation of the fourth aspect, the determining, according to the guard period configuration information of the first SP, whether to establish the guard period for the first SP includes the following.

If the guard period configuration information is the first indication information, establishing the guard period for the first SP.

If the guard period configuration information is the second indication information, and if it is determined, according to the scheduling information of the adjacent network controller received by the second receiving unit, that time and frequency overlapping exists between a second access period and the first SP, and it cannot be determined that the second access period causes no interference to the first SP, establishing the guard period for the first SP.

If the guard period configuration information is the second indication information, and if it is determined, according to the scheduling information of the adjacent network controller received by the second receiving unit, that no time and frequency overlapping exists between a third SP and the first SP, skipping establishing the guard period for the first SP.

If the guard period configuration information is the second indication information, and if it is determined, according to the scheduling information of the adjacent network controller received by the second receiving unit, that time and frequency overlapping exists between a second access period and the first SP, and it cannot be determined that the second access period causes no interference to the first SP, establishing the guard period for the first SP.

In an implementation of the fourth aspect, the first indication information includes any one of third indication information, or fourth indication information, or fifth indication information; and correspondingly, the establishing the guard period for the first SP includes the following.

If the first indication information of the first SP is the third indication information, establishing the guard period only on a current working channel.

If the first indication information of the first SP is the fourth indication information and a station works on a small-bandwidth channel, establishing the guard period on a current working small-bandwidth channel of the station, and establishing the guard period on a large-bandwidth channel whose frequency overlaps with a current working small-bandwidth frequency.

If the first indication information of the first SP is the fourth indication information and a station works on a large-bandwidth channel, establishing the guard period on a current working large-bandwidth channel of the station, and establishing the guard period on a low-frequency small-bandwidth channel whose frequency overlaps with a frequency of the current working large-bandwidth channel.

If the first indication information of the first SP is the fifth indication information, establishing the guard period on a current working large-bandwidth channel, and establishing the guard period on a high-frequency small-bandwidth channel whose frequency overlaps with a frequency of the current working large-bandwidth channel.

In an implementation of the fourth aspect, the establishing the guard period only on a current working channel includes listening on the current working channel only; and if both a physical layer carrier sensing (CS) result and a virtual carrier sensing result show that the current working channel is idle, performing RTS/DMG CTS handshake on the current working channel.

In an implementation of the fourth aspect, the establishing the guard period on a current working small-bandwidth channel of the station, and establishing the guard period on a large-bandwidth channel whose frequency overlaps with a current working small-bandwidth frequency includes listening on the current working small-bandwidth channel of the station. If both a physical layer carrier sensing (CS) result and a virtual carrier sensing result show that the current working small-bandwidth channel is idle, performing RTS/DMG CTS handshake on the current working small-bandwidth channel. This implementation also includes performing RTS/DMG CTS handshake on the large-bandwidth channel whose frequency overlaps with the current working small-bandwidth frequency (e.g. after the RTS/DMG CTS handshake interaction performed on the current working small-bandwidth channel is complete).

In an implementation of the fourth aspect, the establishing the guard period on a current working large-bandwidth channel of the station, and establishing the guard period on a low-frequency small-bandwidth channel whose frequency overlaps with a frequency of the current working large-bandwidth channel includes listening on the current working large-bandwidth channel of the station. If both a physical layer carrier sensing (CS) result and a virtual carrier sensing result show that the current working large-bandwidth channel of the station is idle, performing RTS/DMG CTS handshake on the current working large-bandwidth channel of the station. After the RTS/DMG CTS handshake interaction performed on the current working large-bandwidth channel of the station is complete, performing RTS/DMG CTS handshake on the low-frequency small-bandwidth channel whose frequency overlaps with the frequency of the current working large-bandwidth channel.

In an implementation of the fourth aspect, the establishing the guard period on a current working large-bandwidth channel, and establishing the guard period on a high-frequency small-bandwidth channel whose frequency overlaps with a frequency of the current working large-bandwidth channel includes listening on the current working large-bandwidth channel of the station. If both a physical layer carrier sensing (CS) result and a virtual carrier sensing result show that the current working large-bandwidth channel of the station is idle, performing RTS/DMG CTS handshake on the current working large-bandwidth channel of the station. After the RTS/DMG CTS handshake interaction performed on the current working large-bandwidth channel of the station is complete, performing RTS/DMG CTS handshake on the high-frequency small-bandwidth channel whose frequency overlaps with the frequency of the current working large-bandwidth channel.

In an implementation of the fourth aspect, the guard period configuration information is expressed by using a guard period field or an allocation type field that is added in an extended scheduling element. Correspondingly, the receiving guard period configuration information, sent by a first network controller, of a first SP includes: receiving an extended scheduling element, sent by the first network controller, of the first SP, where the extended scheduling element of the first SP includes the guard period configuration information of the first SP.

In an implementation of the fourth aspect, the method further includes receiving a directional channel quality measurement request element sent by the first network controller, where a directional channel quality measurement time period indicated by the directional channel quality measurement request element covers a listening mode time period of an SP of the station, and channel measurement and channel listening are complete at the same time within the measurement time period; and pointing a receive antenna to a peer station according to the directional channel quality measurement request element, and completing directional channel quality measurement while channel listening required for establishing a guard period is complete within the corresponding SP.

In an implementation of the fourth aspect, the method further includes: if both the physical layer carrier sensing (CS) result and the virtual carrier sensing result show that a channel is idle, directly performing RTS/DMG CTS handshake after the directional channel quality measurement time period indicated by the directional channel quality measurement request element ends.

In an implementation of the fourth aspect, the method further includes: sending a directional channel quality measurement result to the first network controller by using the directional channel quality measurement report element, so that if determining, according to the measurement result, that no mutual interference exists between SPs of a first pair of stations and a second pair of stations, the first network controller determines that time-overlapped SPs are allocated to the first pair of stations and the second pair of stations within a next BI of a current beacon interval BI.

According to a fifth aspect, a network controller is provided, including the following.

A receiver, configured to acquire scheduling information of an adjacent network controller of a first network controller, where scheduling information of a network controller includes an identifier of an access period scheduled by the corresponding network controller, and a start time and duration of the access period corresponding to the identifier of the access period, where the access period includes a service period SP and a contention-based access period CBAP.

A processor, configured to determine, according to scheduling information of the first network controller and the scheduling information, acquired by the receiver, of the adjacent network controller, a status of time and frequency overlapping between a first SP and another access period, except the first SP, scheduled by the first network controller and the adjacent network controller.

The processor is further configured to set guard period configuration information of the first SP according to a pre-acquired interfered status of the first SP and the status, determined by the determining unit, of time and frequency overlapping between the first SP and the another access period, except the first SP, scheduled by the first network controller and the adjacent network controller, where the guard period configuration information includes first indication information or second indication information, the first indication information is used to indicate that a guard period needs to be established for the first SP, and the second indication information is used to indicate that the guard period is allowed to be established for the first SP.

A transmitter, configured to send the guard period configuration information, configured by the processor, of the first SP to a source station and a destination station of the first SP, so that the source station and the destination station of the first SP determine, according to the guard period configuration information of the first SP, whether to establish the guard period for the first SP.

In an implementation of the fifth aspect, that the processor is configured to set the guard period configuration information of the first SP according to the pre-acquired interfered status of the first SP and the status, determined by the determining unit, of time and frequency overlapping between the first SP and the another access period, except the first SP, scheduled by the first network controller and the adjacent network controller includes the following.

If the processor determines that time and frequency overlapping exists between a first access period and the first SP in the another access period, except the first SP, scheduled by the first network controller and the adjacent network controller, and cannot determine, according to the pre-acquired interfered status of the first SP, that the first access period causes no interference to the first SP, setting the guard period configuration information of the first SP to the first indication information.

If the processor determines that no time and frequency overlapping exists between a first access period and the first SP in the another access period, except the first SP, scheduled by the first network controller and the adjacent network controller, setting the guard period configuration information of the first SP to the second indication information.

If the processor determines that time and frequency overlapping exists between a first access period and the first SP in the another access period, except the first SP, scheduled by the first network controller and the adjacent network controller, and determines, according to the pre-acquired interfered status of the first SP, that the first access period causes no interference to the first SP, setting the guard period configuration information of the first SP to the second indication information.

In an implementation of the fifth aspect, the scheduling information further includes an allocation type of the access period, and the allocation type indicates a type of the access period and an allocated channel; and the first indication information includes any one of third indication information, or fourth indication information, or fifth indication information, so that the source station and the destination station of the first SP determine, according to the first indication information of the first SP, a channel on which the guard period established. Correspondingly, that the processor sets the guard period configuration information of the first SP to the first indication information includes the following.

If it is determined that a channel of the first SP is the same as a channel of the first access period, setting the first indication information of the first SP to the third indication information, where the third indication information is used to instruct the source station and the destination station of the first SP to establish the guard period only on a current working channel.

If it is determined that a channel of the first SP is a small-bandwidth channel, and a channel of the first access period is a large-bandwidth channel whose frequency overlaps with a frequency of the small-bandwidth channel of the first SP, setting the first indication information of the first SP to the fourth indication information, where the fourth indication information is used to instruct the source station and the destination station of the first SP to establish the guard period on a current working small-bandwidth channel, and establish the guard period on a large-bandwidth channel whose frequency overlaps with a current working small-bandwidth frequency.

If it is determined that a channel of the first SP is a large-bandwidth channel, and a channel of the first access period is a low-frequency small-bandwidth channel whose frequency overlaps with a frequency of the large-bandwidth channel of the first SP, setting the first indication information of the first SP to the fourth indication information, where the fourth indication information is used to instruct the source station and the destination station of the first SP to establish the guard period on a current working large-bandwidth channel, and establish the guard period on a low-frequency small-bandwidth channel whose frequency overlaps with a frequency of the current working large-bandwidth channel.

If it is determined that a channel of the first SP is a large-bandwidth channel, and a channel of the first access period is a high-frequency small-bandwidth channel whose frequency overlaps with a frequency of the large-bandwidth channel of the first SP, setting the first indication information of the first SP to the fifth indication information, where the fifth indication information is used to instruct the source station and the destination station of the first SP to establish the guard period on a current working large-bandwidth channel, and establish the guard period on a high-frequency small-bandwidth channel whose frequency overlaps with a frequency of the current working large-bandwidth channel.

In an implementation of the fifth aspect, the receiver is configured to: receive the scheduling information sent by the adjacent network controller of the first network controller; or receive interference report information that is sent, by using a cluster report or a DMG service specification element, by a station within a basic service set BSS in which the first network controller is located. The receiver is also configured to acquire the scheduling information of the adjacent network controller according to the interference report information.

In an implementation of the fifth aspect, the guard period configuration information is expressed by using a guard period field or an allocation type field that is added in an extended scheduling element. Correspondingly, the transmitter is further configured to send an extended scheduling element of the first SP to the source station and the destination station of the first SP, where the extended scheduling element of the first SP includes the guard period configuration information of the first SP.

In an implementation of the fifth aspect, the transmitter is further configured to send the scheduling information of the first network controller to the adjacent network controller of the first network controller, so that the adjacent network controller of the first network controller configures, according to the scheduling information of the first network controller, the scheduling information of the adjacent network controller, and a status, pre-acquired by the adjacent network controller, of interference between access periods, guard period configuration information of an SP scheduled by the adjacent network controller.

In an implementation of the fifth aspect, the processor is further configured to: if determining that guard periods need to be established for SPs that are respectively allocated to a first pair of stations and a second pair of stations, according to an allocation status of the SPs corresponding to the first pair of stations and the second pair of stations, set directional channel quality measurement request elements and send the directional channel quality measurement request elements to the first pair of stations and the second pair of stations respectively, so that directional channel quality measurement time periods indicated by the directional channel quality measurement request elements of the first pair of stations and the second pair of stations can cover listening mode time periods at start times of the corresponding SPs, and further the first pair of stations and the second pair of stations respectively point receive antennas to peer stations according to the directional channel quality measurement request elements, and complete directional channel quality measurement while channel listening required for establishing the guard periods is complete within the corresponding SPs.

In an implementation of the fifth aspect, the acquiring unit is further configured to receive directional channel measurement results reported by the first pair of stations and the second pair of stations by using directional channel quality measurement report elements. The processor is further configured to: if determining, according to the measurement results, that no mutual interference exists when the first pair of stations communicates with the second pair of stations, determine that time-overlapped SPs are allocated to the first pair of stations and the second pair of stations at the beginning of a next BI of a current beacon interval BI.

According to a sixth aspect, a station is provided, including: a receiver, configured to receive guard period configuration information, sent by a first network controller, of a first SP, where the guard period configuration information includes first indication information or second indication information, the first indication information is used to indicate that a guard period needs to be established for the first SP, and the second indication information is used to indicate that the guard period is allowed to be established for the first SP; and a processor, configured to determine, according to the guard period configuration information, received by the receiver, of the first SP, whether to establish the guard period for the first SP.

In an implementation of the sixth aspect, the receiver is further configured to receive scheduling information sent by an adjacent network controller of the first network controller, where the scheduling information of the adjacent network controller includes an identifier of an access period scheduled by the adjacent network controller, a start time and duration of the access period corresponding to the identifier of the access period, and a channel type of the access period, where the access period includes a service period SP and a contention-based access period CBAP. In this implementation, the station further includes: a transmitter, configured to send interference report information to the first network controller by using a cluster report or a DMG service specification element, where the interference report information includes the scheduling information sent by the adjacent network controller.

In an implementation of the sixth aspect, if the guard period configuration information received by the receiver is the second indication information, the first network controller belongs to a first cluster, and the first SP is allocated to the $n^{th}$ cluster time interval, that the receiver receives the scheduling information sent by the adjacent network controller of the first network controller includes: the receiver receives the scheduling information of the adjacent network controller within each beacon service period (Beacon SP) by using a cluster mechanism.

In an implementation of the sixth aspect, the processor is configured to perform the following.

If the guard period configuration information is the first indication information, establish the guard period for the first SP.

If the guard period configuration information is the second indication information, and if it is determined, according to the scheduling information of the adjacent network controller received by the second receiving unit, that time and frequency overlapping exists between a second access period and the first SP, and it cannot be determined that the second access period causes no interference to the first SP, establish the guard period for the first SP.

If the guard period configuration information is the second indication information, and if it is determined, according to the scheduling information of the adjacent network controller received by the second receiving unit, that no time and frequency overlapping exists between a third SP and the first SP, skip establishing the guard period for the first SP.

If the guard period configuration information is the second indication information, and if it is determined, according to the scheduling information of the adjacent network controller received by the second receiving unit, that time and frequency overlapping exists between a second access period and the first SP, and it cannot be determined that the second access period causes no interference to the first SP, establish the guard period for the first SP.

In an implementation of the sixth aspect, the first indication information includes any one of third indication information, or fourth indication information, or fifth indication information. Correspondingly, that the processor establishes the guard period for the first SP includes the following.

If the first indication information of the first SP is the third indication information, establishing the guard period only on a current working channel.

If the first indication information of the first SP is the fourth indication information and the station works on a small-bandwidth channel, establishing the guard period on a current working small-bandwidth channel of the station, and establishing the guard period on a large-bandwidth channel whose frequency overlaps with a current working small-bandwidth frequency.

If the first indication information of the first SP is the fourth indication information and the station works on a large-bandwidth channel, establishing the guard period on a current working large-bandwidth channel of the station, and establishing the guard period on a low-frequency small-bandwidth channel whose frequency overlaps with a frequency of the current working large-bandwidth channel.

If the first indication information of the first SP is the fifth indication information, establishing the guard period on a current working large-bandwidth channel, and establishing the guard period on a high-frequency small-bandwidth channel whose frequency overlaps with a frequency of the current working large-bandwidth channel.

In an implementation of the sixth aspect, that the processor establishes the guard period only on the current working channel includes listening on the current working channel only; and if both a physical layer carrier sensing (CS) result and a virtual carrier sensing result show that the current working channel is idle, performing RTS/DMG CTS handshake on the current working channel.

In an implementation of the sixth aspect, that the processor establishes the guard period on the current working small-bandwidth channel of the station, and establishes the guard period on the large-bandwidth channel whose frequency overlaps with the current working small-bandwidth frequency includes listening on the current working small-bandwidth channel of the station. If both a physical layer carrier sensing (CS) result and a virtual carrier sensing result show that the current working small-bandwidth channel is idle, performing RTS/DMG CTS handshake on the current working small-bandwidth channel. This implementation also includes performing RTS/DMG CTS handshake on the large-bandwidth channel whose frequency overlaps with the current working small-bandwidth frequency (e.g. after the RTS/DMG CTS handshake interaction performed on the current working small-bandwidth channel is complete).

In an implementation of the sixth aspect, that the processor establishes the guard period on the current working large-bandwidth channel of the station, and establishes the guard period on the low-frequency small-bandwidth channel whose frequency overlaps with the frequency of the current working large-bandwidth channel includes listening on the current working large-bandwidth channel of the station. If both a physical layer carrier sensing (CS) result and a virtual carrier sensing result show that the current working large-bandwidth channel of the station is idle, performing RTS/DMG CTS handshake on the current working large-bandwidth channel of the station; and performing RTS/DMG CTS handshake on the low-frequency small-bandwidth channel whose frequency overlaps with the frequency of the current working large-bandwidth channel (e.g. after the RTS/DMG CTS handshake interaction performed on the current working large-bandwidth channel of the station is complete).

In an implementation of the sixth aspect, that the processor establishes the guard period on the current working large-bandwidth channel, and establishes the guard period on the high-frequency small-bandwidth channel whose frequency overlaps with the frequency of the current working large-bandwidth channel includes listening on the current working large-bandwidth channel of the station. If both a physical layer carrier sensing (CS) result and a virtual carrier sensing result show that the current working large-bandwidth channel of the station is idle, performing RTS/DMG CTS handshake on the current working large-bandwidth channel of the station; and performing RTS/DMG CTS handshake on the high-frequency small-bandwidth channel whose frequency overlaps with the frequency of the current working large-bandwidth channel (e.g. after the RTS/DMG CTS handshake interaction performed on the current working large-bandwidth channel of the station is complete).

In an implementation of the sixth aspect, the guard period configuration information is expressed by using a guard period field or an allocation type field that is added in an extended scheduling element. Correspondingly, the receiver is further configured to receive an extended scheduling element, sent by the first network controller, of the first SP, where the extended scheduling element of the first SP includes the guard period configuration information of the first SP.

In an implementation of the sixth aspect, the receiver is further configured to receive a directional channel quality measurement request element sent by the first network controller, where a directional channel quality measurement time period indicated by the directional channel quality measurement request element covers a listening mode time period of an SP of the station, and channel measurement and channel listening are complete at the same time within the measurement time period. In this implementation, the processor is further configured to: according to the directional channel quality measurement request element, complete directional channel quality measurement while channel listening for establishing a guard period of the corresponding SP is complete.

In an implementation of the sixth aspect, the processor is further configured to: if both the physical layer carrier sensing (CS) result and the virtual carrier sensing result show that a channel is idle, directly perform RTS/DMG CTS handshake after the directional channel quality measurement time period indicated by the directional channel quality measurement request element ends.

In an implementation of the sixth aspect, the transmitter is further configured to send a directional channel quality measurement result to the first network controller by using the directional channel quality measurement report element, so that if determining, according to the measurement result, that no mutual interference exists between SPs of a first pair of stations and a second pair of stations, the first network controller determines that time-overlapped SPs are allocated to the first pair of stations and the second pair of stations within a next BI of a current beacon interval BI.

According to the network controller, the station, and the method for establishing a guard period provided in the embodiments of the present invention, the network controller includes: an acquiring unit, configured to acquire scheduling information of an adjacent network controller of a first network controller, where scheduling information of a network controller includes an identifier of an access period scheduled by the corresponding network controller, and a start time and duration of the access period corresponding to the identifier of the access period, where the access period includes a service period SP and a contention-based access period CBAP. The network controller also includes a determining unit, configured to determine, according to scheduling information of the first network controller and the scheduling information, acquired by the acquiring unit, of the adjacent network controller, a status of time and frequency overlapping between a first SP and another access period, except the first SP, scheduled by the first network controller and the adjacent network controller. The network controller also includes a scheduling unit, configured to set guard period configuration information of the first SP according to a pre-acquired interfered status of the first SP and the status, determined by the determining unit, of time and frequency overlapping between the first SP and the another access period, except the first SP, scheduled by the first network controller and the adjacent network controller, where the guard period configuration information includes first indication information or second indication information, the first indication information is used to indicate that a guard period needs to be established for the first SP, and the second indication information is used to indicate that the guard period is allowed to be established for the first SP. The network controller also includes a first sending unit, configured to send the guard period configuration information, configured by the scheduling unit, of the first SP to a source station and a destination station of the first SP, so that the source station and the destination station of the first SP determine, according to the guard period configuration information of the first SP, whether to establish the guard period for the first SP. It can be learned from the foregoing description that the network controller provided in the embodiments of the present invention can acquire scheduling information of an adjacent network controller of a first network controller On a basis of having more comprehensive time-domain and frequency-domain scheduling information of an adjacent BSS, when allocating a first SP, the network controller can indicate, according to a status of overlapping between another SP and the first SP, and a status of interference caused by the another SP to the first SP, whether a guard period needs to be established for the first SP. The network controller can also send corresponding indication information to a source station and a destination station of the first SP, so that the source station and the destination station of the first SP accurately determine when to establish the guard period, which reduces protection overheads, avoids interference, and overcomes defects in the prior art that protection overheads increase due to blind establishment of guard periods by a source station and a destination station of an SP, and interference is caused when no guard period is established due to missing scheduling information of an adjacent BSS.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

FIG. 5A is a format of an allocation control field in an extended scheduling element in the prior art;

FIG. 5B is a format of an allocation control field in an extended scheduling element according to an embodiment of the present invention;

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present disclosure.

Figure 1:
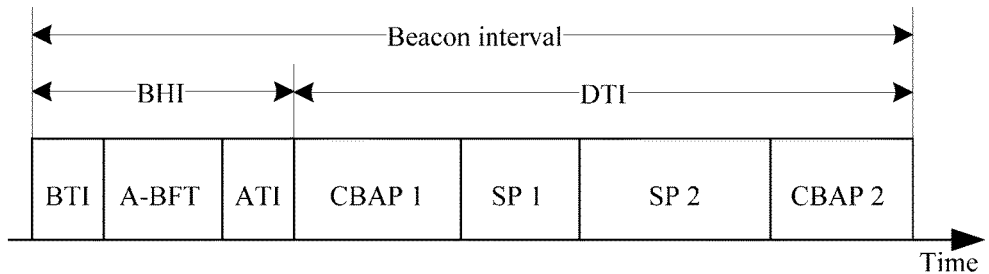
FIG. 1 is a schematic diagram of access periods within a BI.
Figure 2:
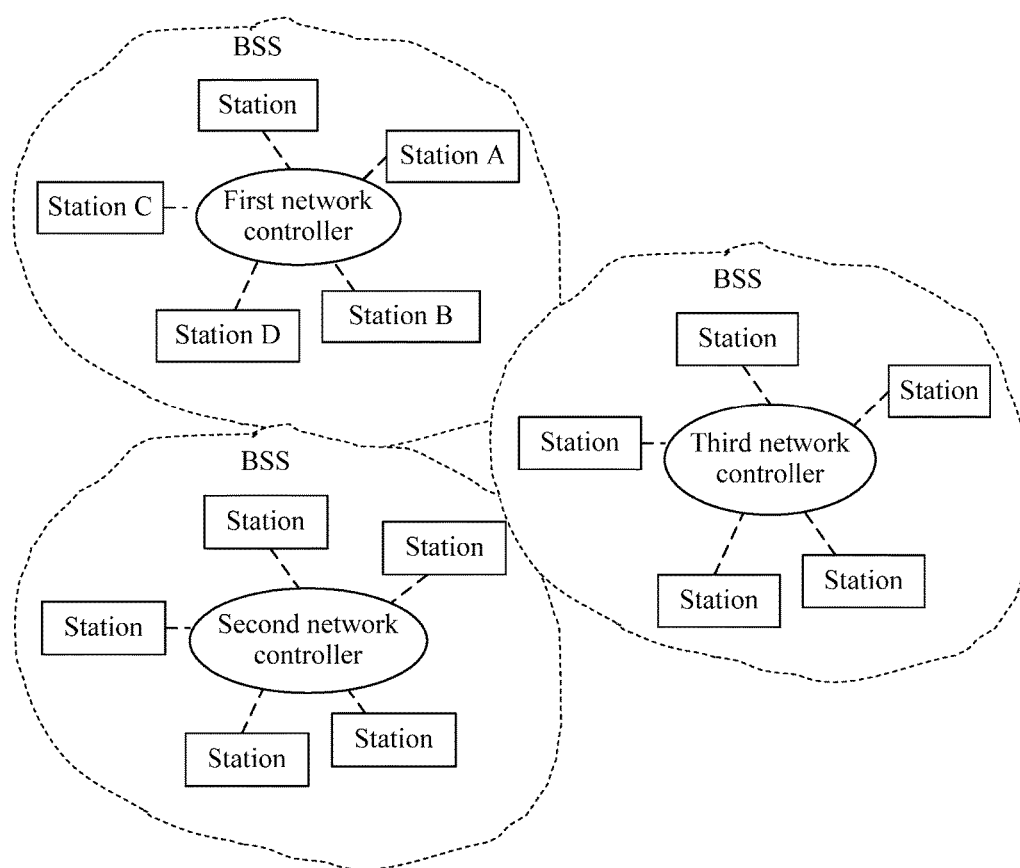
FIG. 2 is a schematic diagram of an application scenario according to an embodiment of the present invention.

The embodiments of the present invention may be applied to a wireless local area network. The wireless local area network may be a basic service set (BSS) including an access point AP, for example, an infrastructure network (infrastructure BSS); or may be a PBSS including no access point AP. In the embodiments of the present invention, the PBSS and the BSS are not differentiated, and are collectively referred to as BSS. Each BSS may include a network controller and multiple stations. The network controller may be an AP, or may be a station having a function of a network controller, for example, a PBSS controller PCP. Refer to FIG. 2, which is a diagram of an application scenario according to an embodiment of the present invention. For ease of understanding, the embodiments of the present invention are described by using the application scenario shown in FIG. 2 as an example. Only three BSSs are exemplarily drawn in FIG. 2. A scenario including another BSS or more BSSs imposes no limitation on the apparatus and the method provided in the embodiments of the present invention.

Embodiment 1

Figure 3:
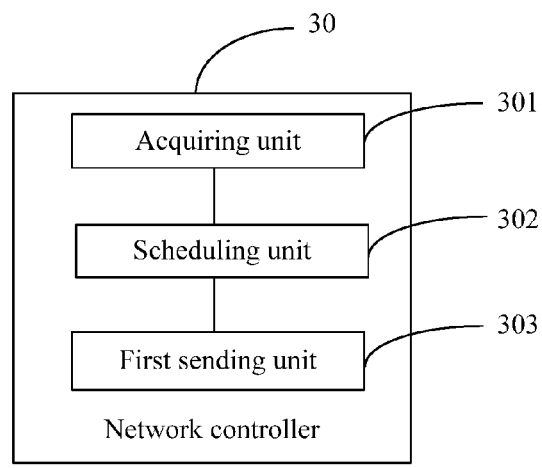
FIG. 3 is a schematic structural diagram of a network controller apparatus according to an embodiment of the present invention.

This embodiment of the present invention provides a network controller 30. Referring to FIG. 3, the network controller 30 includes an acquiring unit 301, a determining unit 302, a scheduling unit 303, and a first sending unit 304.

The acquiring unit 301 is configured to acquire scheduling information of an adjacent network controller of a first network controller, where scheduling information of a network controller includes an identifier of an access period scheduled by the corresponding network controller, and a start time and duration of the access period corresponding to the identifier of the access period, where the access period includes a service period (SP) and a contention-based access period (CBAP).

In this embodiment, the first network controller (current network controller) and the adjacent network controller are relative, and each network controller may be an adjacent network controller, or may be a first network controller (current network controller). In an example of an application scenario shown in FIG. 2, a first network controller is used as a current network controller, and a second network controller and a third network controller are adjacent network controllers of the first network controller.

A network controller may schedule an SP or a CBAP for a station within a BSS in which the network controller is located. For example, the first network controller may allocate an SP or a CBAP to a station within a BSS in which the first network controller is located. Similarly, the second network controller may allocate an SP or a CBAP to a station within a BSS in which the second network controller is located. In like manner, the third network controller may allocate an SP or a CBAP to a station within a BSS in which the third network controller is located.

The scheduling information of the network controller may be sent by using a DMG beacon frame or an Announce announcement frame. The scheduling information of the adjacent network controller may be directly received by the first network controller, or may be received by the station within the BSS in which the first network controller is located, and then uploaded to the first network controller in a form of an interference report.

Therefore, the acquiring unit 301 may be configured to perform the following. Receive the scheduling information sent by the adjacent network controller of the first network controller; or receive interference report information that is sent, by using a cluster report or a DMG service specification element, by a station within a BSS in which the first network controller is located; and acquire the scheduling information of the adjacent network controller according to the interference report information.

The scheduling information reported by the station within the BSS in which the first network controller is located may be scheduling information that is included in a beacon frame of an adjacent BSS and that is required to be reported in a cluster reporting method under a cluster mechanism, or may be scheduling information included when interference information is reported by using a traffic scheduling constraint (TSCONST) field.

It can be understood that relative to the scheduling information of the adjacent network controller carried in the interference information reported by the station, the scheduling information of the adjacent network controller directly received by the first network controller may be more comprehensive because, in some cases, the scheduling information of the adjacent network controller can be received by the first network controller, but may not or cannot be received by the station within the BSS in which the first network controller is located.

For example, due to a geographical location, the first network controller can receive a DMG Beacon of the adjacent network controller, but the station within the BSS in which the first network controller is located may not or cannot receive a DMG Beacon of an adjacent BSS.

As another example, when a first network controller at small bandwidth joins a large-bandwidth cluster, only the first network controller receives a DMG Beacon of an adjacent BSS by using the cluster mechanism.

As a further example, under a dynamic bandwidth coexistence (DBC) MAC protocol, network controllers synchronized in pair may receive a DMG Beacon of an adjacent BSS from each other, but a station cannot.

The determining unit 302 is configured to determine, according to scheduling information of the first network controller and the scheduling information, acquired by the acquiring unit, of the adjacent network controller, a status of time and frequency overlapping between a first SP and another access period, except the first SP, scheduled by the first network controller and the adjacent network controller.

The determining unit 302 may acquire a start time and an end time of another SP according to the start time and duration of the another SP, and likewise, may acquire a start time and an end time of the first SP according to the start time and duration of the first SP. If a time period between a start time and an end time of a second SP intersects with a time period between the start time and the end time of the first SP, it indicates that time overlapping exists between the second SP and the first SP. On the contrary, if the time period between the start time and the end time of the second SP does not intersect with the time period between the start time and the end time of the first SP, it indicates that no time overlapping exists between the second SP and the first SP.

The scheduling unit 303 is configured to set guard period configuration information of the first SP according to a pre-acquired interfered status of the first SP and the status, determined by the determining unit, of time and frequency overlapping between the first SP and the another access period, except the first SP, scheduled by the first network controller and the adjacent network controller.

The first network controller may determine, by requesting a pair of STAs to measure an SP and according to directional channel measurement results reported by the pair of STAs, whether the SP causes interference to the pair of STAs. For example, the first network controller allocates an SP1 and an SP2 to two pairs of STAs (which are respectively indicated as a STA A and a STA B, and a STA C and a STA D) within a BSS respectively. By using an existing spatial sharing mechanism of an SP in 802.11ad, the first network controller sends a directional channel quality request to the STA C and the STA D before the SP1 begins. When the STA A communicates with the STA B by means of beamforming within the SP1, the STA C and the STA D measure a directional channel between the STA C and the STA D. Likewise, the first network controller may also request the STA A and the STA B to measure a directional channel between the STA A and the STA B during the SP2. Within an ATI of a next BI, the first network controller may obtain directional channel quality measurement results of the STA C and the STA D within the SP1, and directional channel quality measurement results of the STA A and STA B within the SP2 respectively by polling the STA A and the STA B, and the STA C and the STA D. According to these measurement results, the first network controller may acquire a status of mutual interference generated when the SP1 overlaps with the SP2.

The guard period configuration information includes first indication information or second indication information, where the first indication information is used to indicate that a guard period needs to be established for the first SP, and the second indication information is used to indicate that the guard period is allowed to be established for the first SP.

That the scheduling unit 303 sets the guard period configuration information of the first SP according to the pre-acquired interfered status of the first SP and the status, determined by the determining unit, of time and frequency overlapping between the first SP and the another access period, except the first SP, scheduled by the first network controller and the adjacent network controller may be implemented in the following ways.

If the determining unit 302 determines that time and frequency overlapping exists between a first access period and the first SP in the another access period, except the first SP, scheduled by the first network controller and the adjacent network controller, and if the determining unit 302 cannot determine, according to the pre-acquired interfered status of the first SP, that the first access period causes no interference to the first SP, then the guard period configuration information of the first SP is set to the first indication information.

If the determining unit determines that no time and frequency overlapping exists between a first access period and the first SP in the another access period, except the first SP, scheduled by the first network controller and the adjacent network controller, then the guard period configuration information of the first SP is set to the second indication information.

If the determining unit determines that time and frequency overlapping exists between a first access period and the first SP in the another access period, except the first SP, scheduled by the first network controller and the adjacent network controller, and if the determining unit determines, according to the pre-acquired interfered status of the first SP, that the first access period causes no interference to the first SP, then the guard period configuration information of the first SP is set to the second indication information.

In this case, the guard period configuration information may be expressed by using one bit. For example, the first indication information may be expressed by using 1, and the second indication information may be expressed by using 0.

Figure 4A:
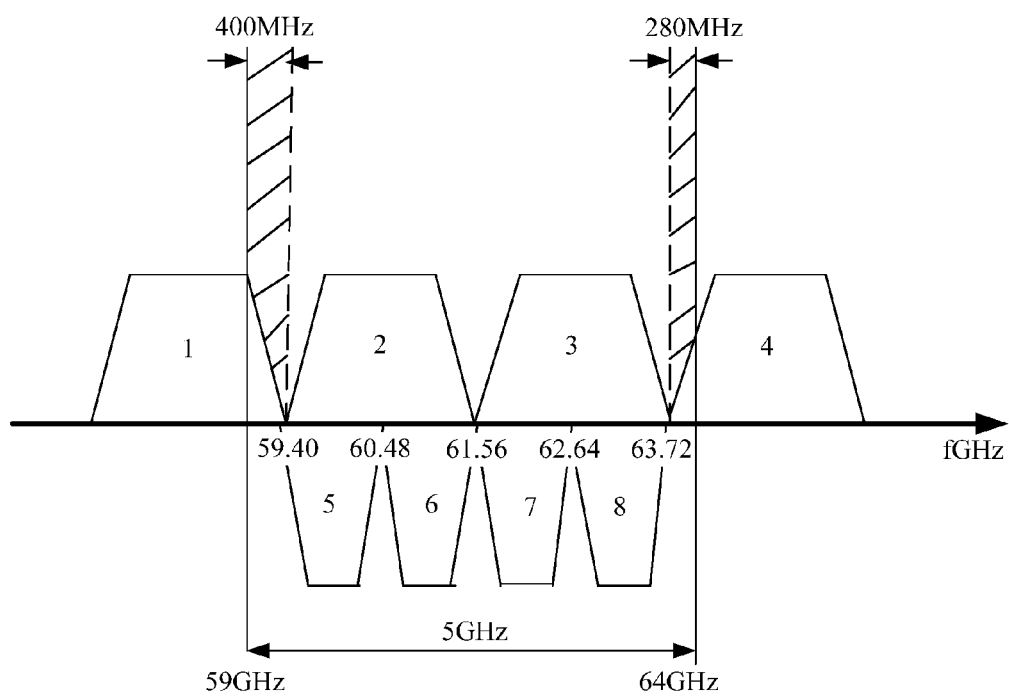
FIG. 4A is a schematic diagram of China's channel division at a 60 GHz frequency band.
Figure 4B:
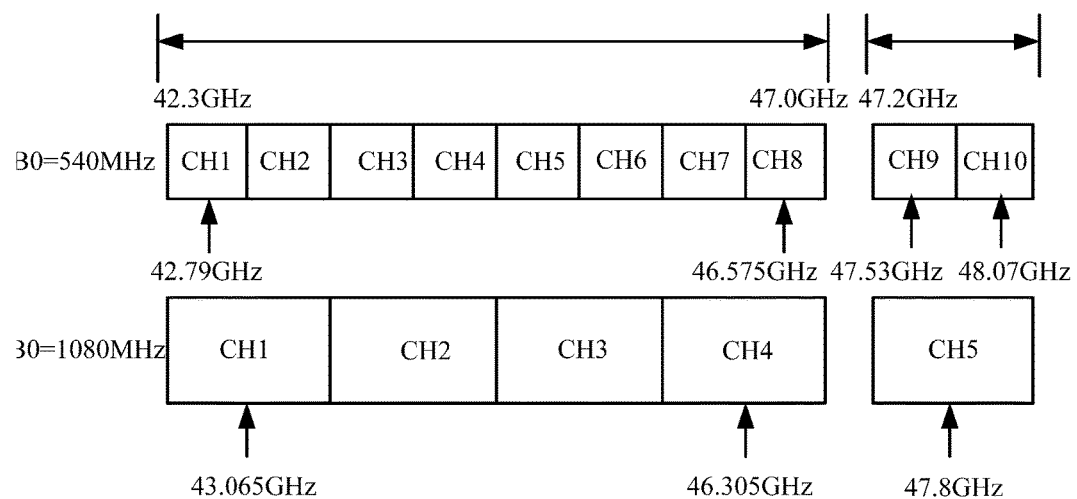
FIG. 4B is a schematic diagram of China's possible spectrum planning and channel division at 45 GHz.

In China's spectrum planning and channel division, a case in which a large-bandwidth channel is divided into two small-bandwidth channels exists. For example, refer to FIG. 4A and FIG. 4B, which are respectively a schematic diagram of China's channel division at a 60 GHz frequency band and a schematic diagram of China's possible spectrum planning and channel division at a 45 GHz frequency band. In China, a case in which a large-bandwidth channel corresponds to two small-bandwidth channels exists at both the 60 GHz frequency band and the 45 GHz frequency band. As shown in FIG. 4A, a large-bandwidth channel 2 corresponds to two small-bandwidth channels 5 and 6, and a large-bandwidth channel 3 corresponds to two small-bandwidth channels 7 and 8. In this case, if time and frequency overlapping exists between a first SP and a second SP, channel interference generated when the first SP and the second SP are on different types of channels is different from channel interference generated when the first SP and the second SP are on a same type of channel. Therefore, in order to further enable a station to establish a guard period on a proper channel, the first network controller may further give an indication by configuring guard period configuration information of an SP.

The scheduling information further includes an allocation type of the access period, and the allocation type indicates a type of the access period and an allocated channel. The first indication information includes any one of third indication information, or fourth indication information, or fifth indication information, so that a source station and a destination station of the first SP determine, according to the first indication information of the first SP, a channel on which the guard period established. In this embodiment of the present invention, the method described below may be applied to all scenarios in which a large-bandwidth channel corresponds to two small-bandwidth channels. Exemplarily, this embodiment is described only by using a scenario of 60 GHz in FIG. 4A, but this imposes no limitation on this embodiment of the present invention.

Correspondingly, that the scheduling unit sets the guard period configuration information of the first SP to the first indication information includes the following several manners.

If it is determined that a channel of the first SP is the same as a channel of the first access period, then the first indication information of the first SP is set to the third indication information, where the third indication information is used to instruct the source station and the destination station of the first SP to establish the guard period only on a current working channel.

For example, referring to FIG. 6, if the channel of the first SP is a channel 2, a type of the first access period is an SP that is herein referred to as a second SP, and a channel of the second SP is 2, because the channel of the first SP is the same as the channel of the second SP, the first network controller sets the first indication information to the third indication information, to instruct the source station and the destination station of the first SP to establish the guard period only on a current working channel (channel 2).

As another example, referring to FIG. 6, if the channel of the first SP is a channel 6, a type of the first access period is an SP that is herein referred to as a second SP, and a channel of the second SP is 6, because the channel of the first SP is the same as the channel of the second SP, the first network controller sets the first indication information to the third indication information, to instruct the source station and the destination station of the first SP to establish the guard period only on a current working channel (channel 6).

If it is determined that a channel of the first SP is a small-bandwidth channel, and a channel of the first access period is a large-bandwidth channel whose frequency overlaps with a frequency of the small-bandwidth channel of the first SP, then the first indication information of the first SP is set to the fourth indication information. The fourth indication information is used to instruct the source station and the destination station of the first SP to establish the guard period on a current working small-bandwidth channel, and establish the guard period on a large-bandwidth channel whose frequency overlaps with a current working small-bandwidth frequency.

For example, referring to FIG. 6, if the channel of the first SP is a channel 5, a type of the first access period is an SP that is herein referred to as a second SP, and a channel of the second SP is a channel 2, because the channel (channel 2) of the second SP is a large-bandwidth channel whose frequency overlaps with a frequency of the small-bandwidth channel (channel 5) of the first SP, the first indication information of the first SP is set to the fourth indication information. The fourth indication information is used to instruct the source station and the destination station of the first SP to establish the guard period on a current working small-bandwidth channel (channel 5), and establish the guard period on a large-bandwidth channel (channel 2) whose frequency overlaps with a current working small-bandwidth frequency.

As another example, referring to FIG. 6, if the channel of the first SP is a channel 8, a type of the first access period is an SP that is herein referred to as a second SP, and a channel of the second SP is a channel 3, because the channel (channel 3) of the second SP is a large-bandwidth channel whose frequency overlaps with a frequency of the small-bandwidth channel (channel 8) of the first SP, the first indication information of the first SP is set to the fourth indication information, where the fourth indication information is used to instruct the source station and the destination station of the first SP to establish the guard period on a current working small-bandwidth channel (channel 8), and establish the guard period on a large-bandwidth channel (channel 3) whose frequency overlaps with a current working small-bandwidth frequency.

If it is determined that a channel of the first SP is a large-bandwidth channel, and a channel of the first access period is a low-frequency small-bandwidth channel whose frequency overlaps with a frequency of the large-bandwidth channel of the first SP, then the first indication information of the first SP is set to the fourth indication information. The fourth indication information is used to instruct the source station and the destination station of the first SP to establish the guard period on a current working large-bandwidth channel, and establish the guard period on a low-frequency small-bandwidth channel whose frequency overlaps with a frequency of the current working large-bandwidth channel.

For example, referring to FIG. 6, if the channel of the first SP is a channel 2, a type of the first access period is an SP that is herein referred to as a second SP, and a channel of the second SP is a channel 5, because the channel (channel 5) of the second SP is a low-frequency small-bandwidth channel whose frequency overlaps with a frequency of the large-bandwidth channel (channel 2) of the first SP, the first indication information of the first SP is set to the fourth indication information. The fourth indication information is used to instruct the source station and the destination station of the first SP to establish the guard period on a current working large-bandwidth channel (channel 2), and establish the guard period on a low-frequency small-bandwidth channel (channel 5) whose frequency overlaps with a frequency of the current working large-bandwidth channel (channel 2).

As another example, referring to FIG. 6, if the channel of the first SP is a channel 3, a type of the first access period is an SP that is herein referred to as a second SP, and a channel of the second SP is a channel 7, because the channel (channel 7) of the second SP is a low-frequency small-bandwidth channel whose frequency overlaps with a frequency of the large-bandwidth channel (channel 3) of the first SP, the first indication information of the first SP is set to the fourth indication information. The fourth indication information is used to instruct the source station and the destination station of the first SP to establish the guard period on a current working large-bandwidth channel (channel 3), and establish the guard period on a low-frequency small-bandwidth channel (channel 7) whose frequency overlaps with a frequency of the current working large-bandwidth channel (channel 3).

If it is determined that a channel of the first SP is a large-bandwidth channel, and a channel of the first access period is a high-frequency small-bandwidth channel whose frequency overlaps with a frequency of the large-bandwidth channel of the first SP, then the first indication information of the first SP is set to the fifth indication information. The fifth indication information is used to instruct the source station and the destination station of the first SP to establish the guard period on a current working large-bandwidth channel, and establish the guard period on a high-frequency small-bandwidth channel whose frequency overlaps with a frequency of the current working large-bandwidth channel.

For example, referring to FIG. 6, if the channel of the first SP is a channel 2, a type of the first access period is an SP that is herein referred to as a second SP, and a channel of the second SP is a channel 6, because the channel (channel 6) of the second SP is a high-frequency small-bandwidth channel whose frequency overlaps with a frequency of the large-bandwidth channel (channel 2) of the first SP, the first indication information of the first SP is set to the fifth indication information. The fifth indication information is used to instruct the source station and the destination station of the first SP to establish the guard period on a current working large-bandwidth channel (channel 2), and establish the guard period on a high-frequency small-bandwidth channel (channel 6) whose frequency overlaps with a frequency of the current working large-bandwidth channel (channel 2).

As another example, referring to FIG. 6, if the channel of the first SP is a channel 3, a type of the first access period is an SP that is herein referred to as a second SP, and a channel of the second SP is a channel 8, because the channel (channel 8) of the second SP is a high-frequency small-bandwidth channel whose frequency overlaps with a frequency of the large-bandwidth channel (channel 3) of the first SP, then the first indication information of the first SP is set to the fifth indication information. The fifth indication information is used to instruct the source station and the destination station of the first SP to establish the guard period on a current working large-bandwidth channel (channel 3), and establish the guard period on a high-frequency small-bandwidth channel (channel 8) whose frequency overlaps with a frequency of the current working large-bandwidth channel (channel 3).

In this case, the guard period configuration information may be expressed by using two bits. For example, the second indication information may be expressed by using 00, and the third indication information, the fourth indication information, and the fifth indication information in the first indication information may be expressed by using one of 01, 10, and 11 respectively. Preferably, the guard period configuration information may be expressed by using a field in an extended scheduling element. Refer to FIG. 5A, which is a format of an allocation control field in an extended scheduling element in the prior art. It can be learned from FIG. 5A that the extended scheduling element in the prior art does not indicate information about whether to establish a guard period and on which channel the guard period needs to be established. Refer to FIG. 5B, which is a format of an allocation control field in an extended scheduling element according to an embodiment of the present invention. It can be learned from FIG. 5B that a guard period field including two bits (for example, B13 and B14) is added in the extended scheduling element in this embodiment of the present invention. For SP allocation, reference may be made to the foregoing method to configure a guard period, so as to indicate whether to establish the guard period and a channel on which the guard period established. For CBAP allocation, the guard period field is reserved.

In another implementation, an allocation type field in B4 to B6 in FIG. 5B may be used as a guard period indication field. A specific configuration may be shown below in Table 1.

TABLE 1

| Bit 4 | Bit 5 | Bit 6 | Meaning |
|---|---|---|---|
| 0 | 0 | 0 | An SP is allocated to a large-bandwidth channel, and no guard period needs to be established. |
| 0 | 1 | 0 | An SP is allocated to a small-bandwidth channel, and no guard period needs to be established. |
| 1 | 0 | 0 | A CBAP is allocated to a large-bandwidth channel. |
| 1 | 1 | 0 | A CBAP is allocated to a small-bandwidth channel. |
| 0 | 0 | 1 | For an SP, a guard period needs to be established only on a current channel. |
| 0 | 1 | 1 | An SP is allocated to a small-bandwidth channel. In addition to that a guard period needs to be established on a current channel, the guard period should also be established on a large-bandwidth channel that overlaps with the small-bandwidth channel. |
| 1 | 0 | 1 | An SP is allocated to a large-bandwidth channel. In addition to that a guard period needs to be established on a current channel, the guard period should also be established on a low-frequency small-bandwidth channel (for example, a channel 5/7) that overlaps with the large-bandwidth channel. |
| 1 | 1 | 1 | An SP is allocated to a large-bandwidth channel. In addition to that a guard period needs to be established on a current channel, the guard period should also be established on a high-frequency small-bandwidth channel (for example, a channel 6/8) that overlaps with the large-bandwidth channel. |

The first sending unit 304 is configured to send the guard period configuration information, configured by the scheduling unit, of the first SP to the source station and the destination station of the first SP, so that the source station and the destination station of the first SP determine, according to the guard period configuration information of the first SP, whether to establish the guard period for the first SP.

The first sending unit 304 is configured to send an extended scheduling element of the first SP to the source station and the destination station of the first SP, where the extended scheduling element of the first SP includes the guard period configuration information of the first SP.

According to the network controller provided in this embodiment of the present invention, the network controller includes the following. An acquiring unit configured to acquire scheduling information of an adjacent network controller of a first network controller. Scheduling information of a network controller includes an identifier of an access period scheduled by the corresponding network controller, and a start time and duration of the access period corresponding to the identifier of the access period. The access period includes a service period SP and a contention-based access period CBAP. The network controller also includes a determining unit configured to determine, according to scheduling information of the first network controller and the scheduling information acquired by the acquiring unit of the adjacent network controller, a status of time and frequency overlapping between a first SP and another access period, except the first SP, scheduled by the first network controller and the adjacent network controller. The network controller also includes a scheduling unit configured to set guard period configuration information of the first SP according to a pre-acquired interfered status of the first SP and the status, determined by the determining unit, of time and frequency overlapping between the first SP and the another access period, except the first SP, scheduled by the first network controller and the adjacent network controller. The guard period configuration information includes first indication information or second indication information, the first indication information is used to indicate that a guard period needs to be established for the first SP, and the second indication information is used to indicate that the guard period is allowed to be established for the first SP. The network controller also includes a first sending unit configured to send the guard period configuration information, configured by the scheduling unit, of the first SP to a source station and a destination station of the first SP, so that the source station and the destination station of the first SP determine, according to the guard period configuration information of the first SP, whether to establish the guard period for the first SP. It can be learned from the foregoing description that the network controller provided in this embodiment of the present invention can acquire scheduling information of an adjacent network controller of a first network controller. On a basis of having more comprehensive time-domain and frequency-domain scheduling information of an adjacent BSS, when allocating a first SP, indicate, according to a status of overlapping between another SP and the first SP, and a status of interference caused by the another SP to the first SP, whether to establish a guard period for the first SP; and then send corresponding indication information to a source station and a destination station of the first SP, so that the source station and the destination station of the first SP accurately determine when to establish the guard period, which reduces protection overheads, avoids interference, and overcomes defects in the prior art that protection overheads increase due to blind establishment of guard periods by a source station and a destination station of an SP, and interference is caused when no guard period is established due to missing scheduling information of an adjacent BSS.

Further, the scheduling unit 303 is further configured to perform the following. If it is determined that guard periods need to be established for SPs that are respectively allocated to a first pair of stations and a second pair of stations, according to an allocation status of the SPs corresponding to the first pair of stations and the second pair of stations, set directional channel quality measurement request elements and send the directional channel quality measurement request elements to the first pair of stations and the second pair of stations respectively, so that directional channel quality measurement time periods indicated by the directional channel quality measurement request elements of the first pair of stations and the second pair of stations can cover listening mode time periods at start times of the corresponding SPs, and further the first pair of stations and the second pair of stations respectively point receive antennas to peer stations according to the directional channel quality measurement request elements, and complete directional channel quality measurement while channel listening required for establishing the guard periods is complete within the corresponding SPs.

The first network controller adjusts, by setting the directional channel quality measurement request elements of the first pair of stations and the second pair of stations, duration of the measurement time periods of the SPs corresponding to the first pair of stations and the second pair of stations, and data sending duration, so that an RTS/a DMG CTS handshake process of the first pair of stations and the second pair of stations for establishing the guard periods and data communication within the guard periods do not cause interference to an SP of another pair of stations.

For example, it is assumed that the first network controller first selects, according to beamforming training results of STAs, two pairs of STAs with a relatively small probability of mutual interference, that is, a STA A and a STA B, and a STA C and a STA D, to execute a "spatial sharing and interference suppression" function, with a purpose of performing directional channel measurement between the STA A and the STA B, and between the STA C and the STA D. If measurement results show that no mutual interference exists during directional communication between the STAs A and B, and between the STAs C and D, a PCP/an AP may allocate time-overlapped SPs to the STA A and the STA B, and the STA C and the STA D.

By using the newly added "guard period" field, in a process of establishing spatial sharing of an SP, the first network controller may combine a time of mutual directional channel measurement between two SPs and a required listening mode time in a guard period establishment process. "Spatial sharing and interference suppression" requires that a measurement method for performing directional channel measurement by a STA before SP overlapping is complete should be an ANIPI (average noise plus interference power indicator), but the STA also measures noise and interference of a channel when the STA is in a listening mode in a guard period establishment process. Therefore, the measurement process required by "spatial sharing and interference suppression" and the listening mode required for establishing a guard period may be combined in terms of time, thereby reducing time overheads.

The following describes this process by using a specific example. It is assumed that both an SP1 and an SP3 are allocated to a STA A and a STA B, while an SP2 is allocated to a STA C and a STA D, where no guard period needs to be established for the SP1, and guard periods need to be established for the SP2 and the SP3 because the SP2 and the SP3 may be interfered by an external network.

When the first network controller allocates the SP2 and the SP3, because the SP2 overlaps with the SP1, and the SP3 overlaps with the SP2, the first network controller cannot determine that the SP2 and the SP3 are free from interference. Therefore, the first network controller sets "guard period" fields of the SP2 and the SP3 to the first indication information according to a setting of the guard period field. In addition, the first network controller sets a "measurement duration" field in a channel quality measurement request element to duration of an overlapping part between the SP2 and the SP1.

In the "spatial sharing and interference suppression" mechanism, if a directional quality measurement time period in a measurement request element whose measurement type is Directional Channel Quality Request and that is sent by the first network controller covers a minimum time period required for establishing a guard period at a start time of an SP, owners of the SP2 and the SP3, that is, the STA C and the STA D, and the STA A and the STA B, may regard a measurement duration field in the measurement request element whose measurement type is Directional Channel Quality Request and that is requested by the first network controller, as a requirement of a listening mode time period required during guard period establishment; complete channel listening, which needs to be performed for guard period establishment, while directional channel measurement is complete; and report listening results by using measurement report elements whose measurement types are Directional Channel Quality Report. If the channel listening results are that a channel is idle, the STAs C and D, and the STAs A and B may directly perform RTS/DMG CTS handshake after the measurement time specified in the measurement request element whose measurement type is Directional Channel Quality Request ends, thereby reducing time overheads required for being in the listening mode during guard period establishment.

Figure 6A:
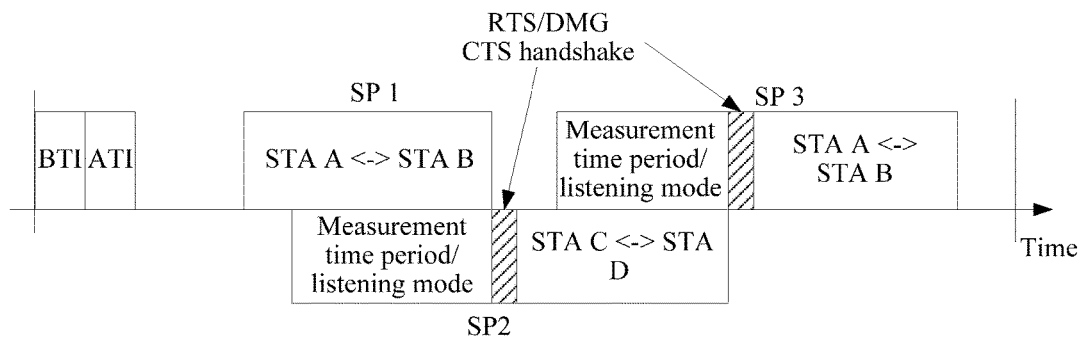
FIG. 6A is a schematic diagram of combining processes of spatial multiplexing measurement and guard period establishment of an SP according to an embodiment of the present invention.

For example, refer to FIG. 6A. For example, the first network controller receives scheduling information of another network of a same channel, where the scheduling information shows that interference from communication of an adjacent BSS may exist within the SP2 and the SP3. Therefore, the guard periods need to be established for the SP2 and the SP3. For another example, in 802.11ad, when a "guard period" field in an ECPAC (extended centralized PCP/AP cluster) policy element is set to the first indication information, it is required that a guard period should be established for each SP. In a case in which a guard period needs to be established for an SP, the 802.11ad standard requires that source and destination STAs of the SP should be in the listening mode for at least 150 microseconds after the SP begins. Therefore, the listening mode is an inherent overhead in a guard period establishment process. With the foregoing method, the listening mode may also be used as a measurement time period in the "spatial sharing and interference suppression" mechanism, so that the source and destination STAs of the SP complete, while completing channel listening, channel measurement required by "spatial sharing and interference suppression".

Further, the acquiring unit 301 is further configured to receive directional channel measurement results reported by the first pair of stations and the second pair of stations by using directional channel quality measurement report elements. The scheduling unit 303 is further configured to determine that time-overlapped SPs are allocated to the first pair of stations and the second pair of stations at the beginning of a next BI of a current beacon interval BI, if it is determined, according to the measurement results, that no mutual interference exists when the first pair of stations communicates with the second pair of stations.

Figure 6B:
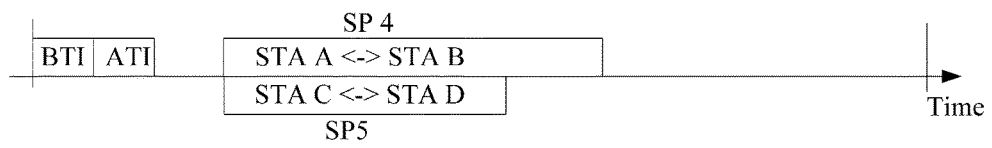
FIG. 6B is a schematic diagram of implementing spatial sharing of an SP between a STA A and a STA B, and between a STA C and a STA D according to an embodiment of the present invention.

Referring to FIG. 6B, if the measurement results received by the first network controller show that no mutual interference exists during communication between the STAs A and B and the STAs C and D, time-overlapped SPs (an SP4 and an SP5 in FIG. 6B) are allocated to the STA A and the STA B, and the STA C and the STA D within a next BI.

Figure 7:
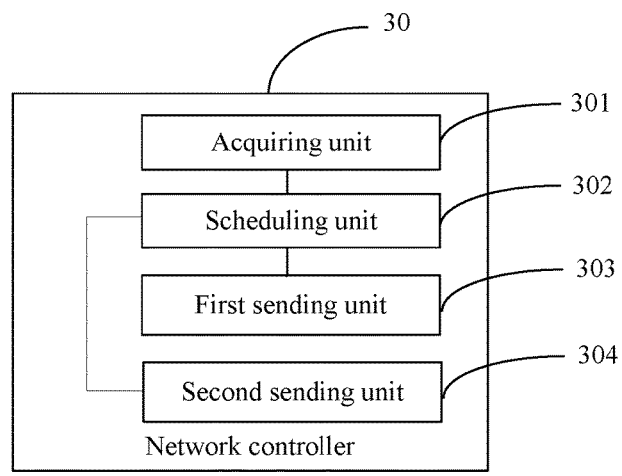
FIG. 7 is a schematic structural diagram of another network controller apparatus according to an embodiment of the present invention.

Further, referring to FIG. 7, the network controller 30 further includes: a second sending unit 304, configured to send the scheduling information of the first network controller to the adjacent network controller of the first network controller, so that the adjacent network controller of the first network controller configures, according to the scheduling information of the first network controller, the scheduling information of the adjacent network controller, and a status, pre-acquired by the adjacent network controller, of interference between access periods, guard period configuration information of an SP scheduled by the adjacent network controller.

Embodiment 2

Figure 8:
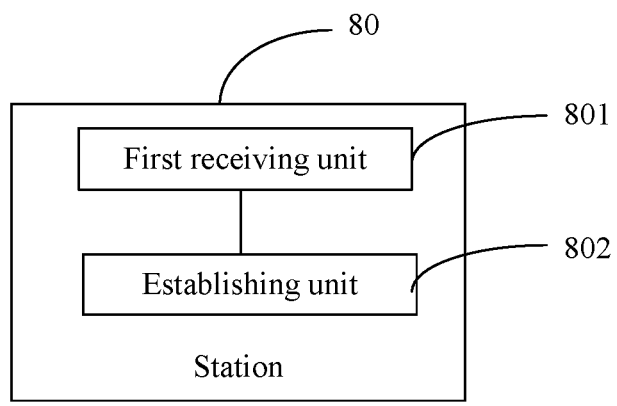
FIG. 8 is a schematic structural diagram of a station apparatus according to an embodiment of the present invention.

This embodiment provides a station 80. Referring to FIG. 8, the station 80 includes a first receiving unit 801 and an establishing unit 802.

The first receiving unit 801 is configured to receive guard period configuration information, sent by a first network controller, of a first SP, where the guard period configuration information includes first indication information or second indication information, the first indication information is used to indicate that a guard period needs to be established for the first SP, and the second indication information is used to indicate that the guard period is allowed to be established for the first SP.

The establishing unit 802 is configured to determine, according to the guard period configuration information, received by the first receiving unit, of the first SP, whether to establish the guard period for the first SP.

Figure 9:
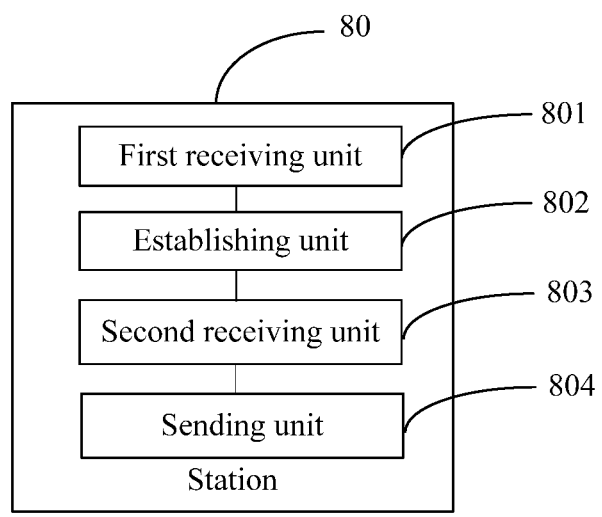
FIG. 9 is a schematic structural diagram of another station apparatus according to an embodiment of the present invention.

Further, referring to FIG. 9, the station 80 further includes: a second receiving unit 803 and a sending unit 804.

The second receiving unit 803 is configured to receive scheduling information sent by an adjacent network controller of the first network controller, where the scheduling information of the adjacent network controller includes an identifier of an access period scheduled by the adjacent network controller, a start time and duration of the access period corresponding to the identifier of the access period, and a channel type of the access period, where the access period includes a service period SP and a contention-based access period CBAP.

If the guard period configuration information received by the first receiving unit is the second indication information, the first network controller belongs to a first cluster, and the first SP is allocated to the $n^{th}$ cluster time interval (ClusterTimeInter), that the second receiving unit receives the scheduling information sent by the adjacent network controller of the first network controller includes the second receiving unit receives the scheduling information of the adjacent network controller within each beacon service period (Beacon SP) by using a cluster mechanism.

Figure 10:
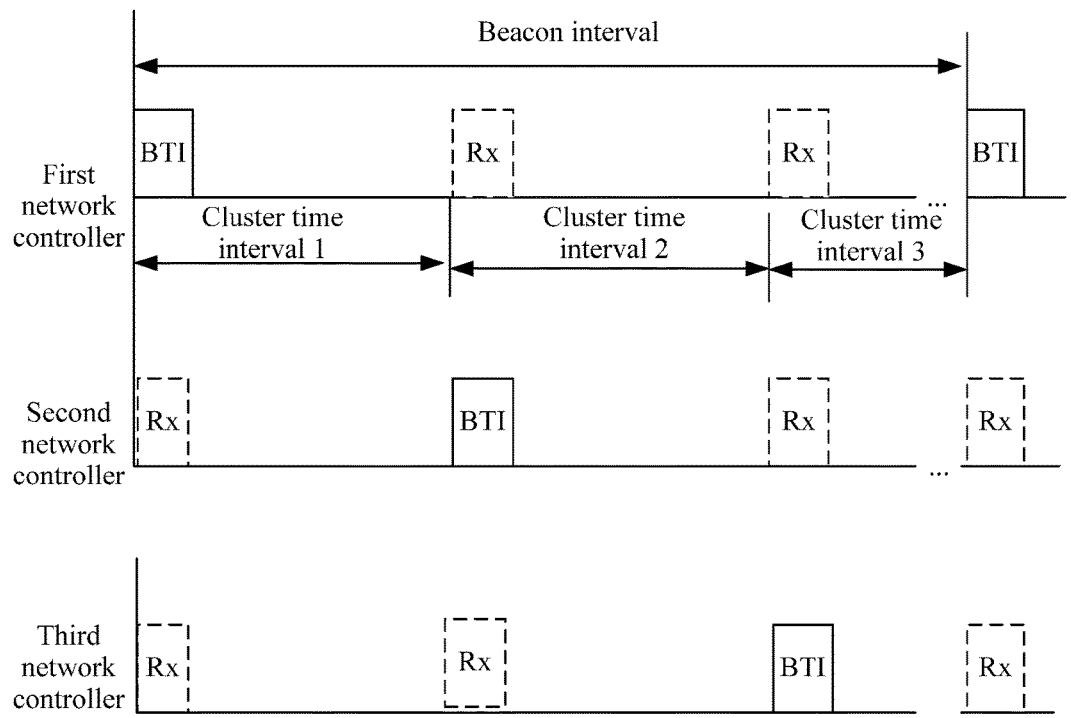
FIG. 10 is a schematic diagram of listening by a STA within a Beacon SP under a cluster mechanism according to an embodiment of the present invention.

Referring to FIG. 10, for example, if the first network controller is a synchronous network controller, and an SP1 is allocated to a ClusterTimeInterv 3, source and destination STAs of the SP1 need to listen on a channel within a Beacon SP2 corresponding to a ClusterTimeInterv 2, and attempt to receive scheduling information of a cluster member, that is, a second network controller.

The sending unit 804 is configured to send interference report information to the first network controller by using a cluster report or a DMG service specification element, where the interference report information includes the scheduling information sent by the adjacent network controller.

The establishing unit 702 is configured to establish the guard period for the first SP, if the guard period configuration information is the first indication information. Or if the guard period configuration information is the second indication information, and if it is determined, according to the scheduling information of the adjacent network controller received by the second receiving unit, that time and frequency overlapping exists between a second access period and the first SP, and it cannot be determined that the second access period causes no interference to the first SP, then the establishing unit 702 is configured to establish the guard period for the first SP. If the guard period configuration information is the second indication information, and if it is determined, according to the scheduling information of the adjacent network controller received by the second receiving unit, that no time and frequency overlapping exists between a third SP and the first SP, then the establishing unit 702 is configured to skip establishing the guard period for the first SP. If the guard period configuration information is the second indication information, and if it is determined, according to the scheduling information of the adjacent network controller received by the second receiving unit, that time and frequency overlapping exists between a second access period and the first SP, and it cannot be determined that the second access period causes no interference to the first SP, then the establishing unit 702 is configured to establish the guard period for the first SP.

In this case, the guard period configuration information may be expressed by using one bit. For example, the first indication information may be expressed by using 1, and the second indication information may be expressed by using 0.

Preferably, the first indication information includes any one of third indication information, or fourth indication information, or fifth indication information. In this case, the guard period configuration information may be expressed by using two bits. For example, the second indication information may be expressed by using 00, and the third indication information, the fourth indication information, and the fifth indication information in the first indication information may be expressed by using 01, 10, and 11 respectively. Preferably, the guard period configuration information may be expressed by using a field in an extended scheduling element. Refer to FIG. 5A, which is a format of an allocation control field in an extended scheduling element in the prior art. It can be learned from FIG. 5A that the extended scheduling element in the prior art does not indicate information about whether to establish a guard period and on which channel the guard period needs to be established. Refer to FIG. 5B, which is a format of an allocation control field in an extended scheduling element according to an embodiment of the present invention. It can be learned from FIG. 5B that a guard period field including two bits (for example, B13 and B14) is added in the extended scheduling element in this embodiment of the present invention.

In another implementation, an allocation type field in B4 to B6 in FIG. 5B may be used as a guard period indication field. A specific configuration may be shown in Table 1.

Correspondingly, the first receiving unit 801 is further configured to receive an extended scheduling element, sent by the first network controller, of the first SP, where the extended scheduling element of the first SP includes the guard period configuration information of the first SP.

Correspondingly, that the establishing unit 802 establishes the guard period for the first SP may be implemented in the following manners. If the first indication information of the first SP is the third indication information, then the establishing unit 802 establishes the guard period only on a current working channel. If the first indication information of the first SP is the fourth indication information and the station works on a small-bandwidth channel, then the establishing unit 802 establishes the guard period on a current working small-bandwidth channel of the station, and establishes the guard period on a large-bandwidth channel whose frequency overlaps with a current working small-bandwidth frequency. If the first indication information of the first SP is the fourth indication information and the station works on a large-bandwidth channel, then the establishing unit 802 establishes the guard period on a current working large-bandwidth channel of the station, and establishes the guard period on a low-frequency small-bandwidth channel whose frequency overlaps with a frequency of the current working large-bandwidth channel. If the first indication information of the first SP is the fifth indication information, then the establishing unit 802 establishes the guard period on a current working large-bandwidth channel, and establishes the guard period on a high-frequency small-bandwidth channel whose frequency overlaps with a frequency of the current working large-bandwidth channel.

The following separately describes guard period establishment processes in the foregoing various cases.

The establishing unit 802 establishing the guard period only on the current working channel includes: listening on the current working channel only; and if both a physical layer carrier sensing (CS) result and a virtual carrier sensing result show that the current working channel is idle, performing RTS/DMG CTS handshake on the current working channel.

Figure 11A:
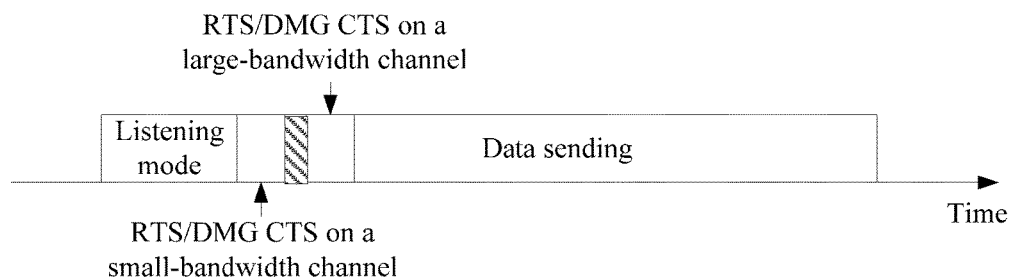
FIG. 11A, FIG. 11B, and FIG. 11C are schematic diagrams of establishing a guard period according to an embodiment of the present invention.

A process in which the establishing unit 802 establishes the guard period on the current working small-bandwidth channel of the station, and establishes the guard period on the large-bandwidth channel whose frequency overlaps with the current working small-bandwidth frequency may be shown in FIG. 11A, and includes: listening on the current working small-bandwidth channel of the station. If both a physical layer carrier sensing (CS) result and a virtual carrier sensing result show that the current working small-bandwidth channel is idle, then performing RTS/DMG CTS handshake on the current working small-bandwidth channel. After the RTS/DMG CTS handshake interaction performed on the current working small-bandwidth channel is complete, performing RTS/DMG CTS handshake on the large-bandwidth channel whose frequency overlaps with the current working small-bandwidth frequency, where the two handshakes should be separated by a guard interval (GI)+ short interframe space (SIFS), as indicated by a shadow slash part in FIG. 11B.

Figure 11B:
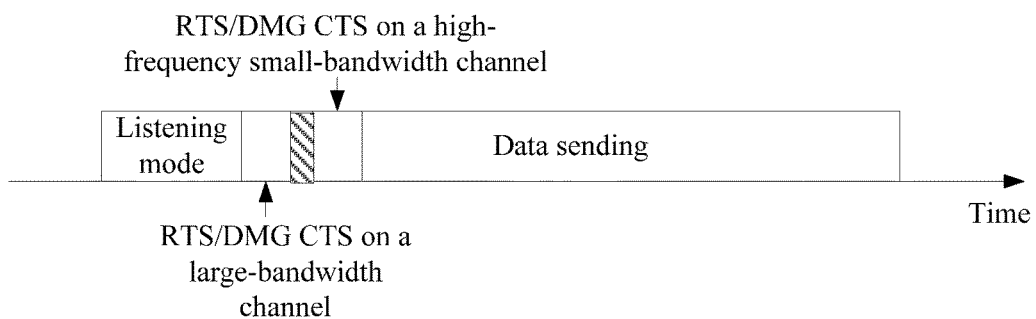
Figure 11C:
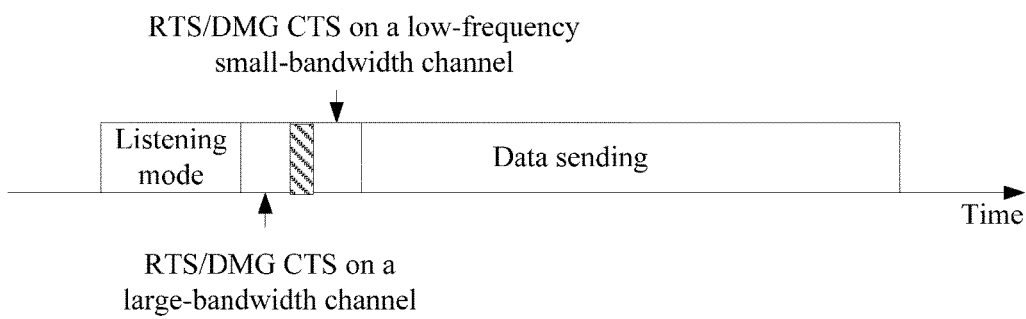

A process in which the establishing unit 802 establishes the guard period on the current working large-bandwidth channel of the station, and establishes the guard period on the low-frequency small-bandwidth channel whose frequency overlaps with the frequency of the current working large-bandwidth channel may be shown in FIG. 11C, and may include listening on the current working large-bandwidth channel of the station. If both a physical layer carrier sensing (CS) result and a virtual carrier sensing result show that the current working large-bandwidth channel of the station is idle, then performing RTS/DMG CTS handshake on the current working large-bandwidth channel of the station. After the RTS/DMG CTS handshake interaction performed on the current working large-bandwidth channel of the station is complete, performing RTS/DMG CTS handshake on the low-frequency small-bandwidth channel whose frequency overlaps with the frequency of the current working large-bandwidth channel, where the two handshakes should be separated by a guard interval (GI)+short interframe space (SIFS), as indicated by a shadow slash part in FIG. 11C.

The establishing unit 802 establishing the guard period on the current working large-bandwidth channel, and establishing the guard period on the high-frequency small-bandwidth channel whose frequency overlaps with the frequency of the current working large-bandwidth channel may be shown in FIG. 11B, and includes listening on the current working large-bandwidth channel of the station. If both a physical layer carrier sensing (CS) result and a virtual carrier sensing result show that the current working large-bandwidth channel of the station is idle, then performing RTS/DMG CTS handshake on the current working large-bandwidth channel of the station. After the RTS/DMG CTS handshake interaction performed on the current working large-bandwidth channel of the station is complete, performing RTS/DMG CTS handshake on the high-frequency small-bandwidth channel whose frequency overlaps with the frequency of the current working large-bandwidth channel. The two handshakes should be separated by a guard interval (GI)+short interframe space (SIFS), as indicated by a shadow slash part in FIG. 11B.

Further, the first receiving unit 801 is further configured to receive a directional channel quality measurement request element sent by the first network controller, where a directional channel quality measurement time period indicated by the directional channel quality measurement request element covers a listening mode time period of an SP of the station, and channel measurement and channel listening are complete at the same time within the measurement time period.

By using the newly added "guard period" field, in a process of establishing spatial sharing of an SP, the first network controller may combine a time of mutual directional channel measurement between two SPs and a required listening mode time in a guard period establishment process. "Spatial sharing and interference suppression" requires that a measurement method for performing directional channel measurement by a STA before SP overlapping is complete should be an ANIPI (average noise plus interference power indicator), but the STA also measures noise and interference of a channel when the STA is in a listening mode in a guard period establishment process. Therefore, the measurement process required by "spatial sharing and interference suppression" and the listening mode required for establishing a guard period may be combined in terms of time, thereby reducing time overheads.

The establishing unit 802 is further configured to point a receive antenna to a peer station according to the directional channel quality measurement request element, and complete directional channel quality measurement while channel listening required for establishing a guard period is complete within the corresponding SP.

In the "spatial sharing and interference suppression" mechanism, if a directional quality measurement time period in a measurement request element whose measurement type is Directional Channel Quality Request and that is sent by the first network controller covers a minimum time period required for establishing a guard period at a start time of an SP, an owner STA of the SP may regard a measurement duration field in the measurement request element whose measurement type is Directional Channel Quality Request and that is requested by the first network controller, as a requirement of a listening mode time period required during guard period establishment; complete channel listening, which needs to be performed for guard period establishment, while directional channel measurement is complete; and report a listening result by using a measurement report element whose measurement type is Directional Channel Quality Report. If the channel listening result is that a channel is idle, the STA may directly perform RTS/DMG CTS handshake after the measurement time specified in the measurement request element whose measurement type is Directional Channel Quality Request ends, thereby reducing time overheads required for being in the listening mode during guard period establishment.

Further, the establishing unit 802 is further configured to: if both the physical layer carrier sensing (CS) result and the virtual carrier sensing result show that a channel is idle, directly perform RTS/DMG CTS handshake after the directional channel quality measurement time period indicated by the directional channel quality measurement request element ends.

Further, the sending unit 804 is further configured to send a directional channel quality measurement result to the first network controller by using the directional channel quality measurement report element, so that if determining, according to the measurement result, that no mutual interference exists between SPs of a first pair of stations and a second pair of stations, the first network controller determines that time-overlapped SPs are allocated to the first pair of stations and the second pair of stations within a next BI of a current beacon interval BI.

According to the station provided in this embodiment of the present invention, the station includes: a first receiving unit, configured to receive guard period configuration information, sent by a first network controller, of a first SP, where the guard period configuration information includes first indication information or second indication information, the first indication information is used to indicate that a guard period needs to be established for the first SP, and the second indication information indicates that the guard period is allowed to be established for the first SP; and an establishing unit, configured to determine, according to the guard period configuration information, received by the first receiving unit, of the first SP, whether to establish the guard period for the first SP. It can be learned from the foregoing description that the station provided in this embodiment of the present invention can accurately determine, by receiving indication information sent by a first network controller, when to establish a guard period, which reduces protection overheads, avoids interference, and overcomes defects in the prior art that protection overheads increase due to blind establishment of guard periods by a source station and a destination station of an SP, and interference is caused when no guard period is established due to missing scheduling information of an adjacent BSS.

Embodiment 3

Figure 12:
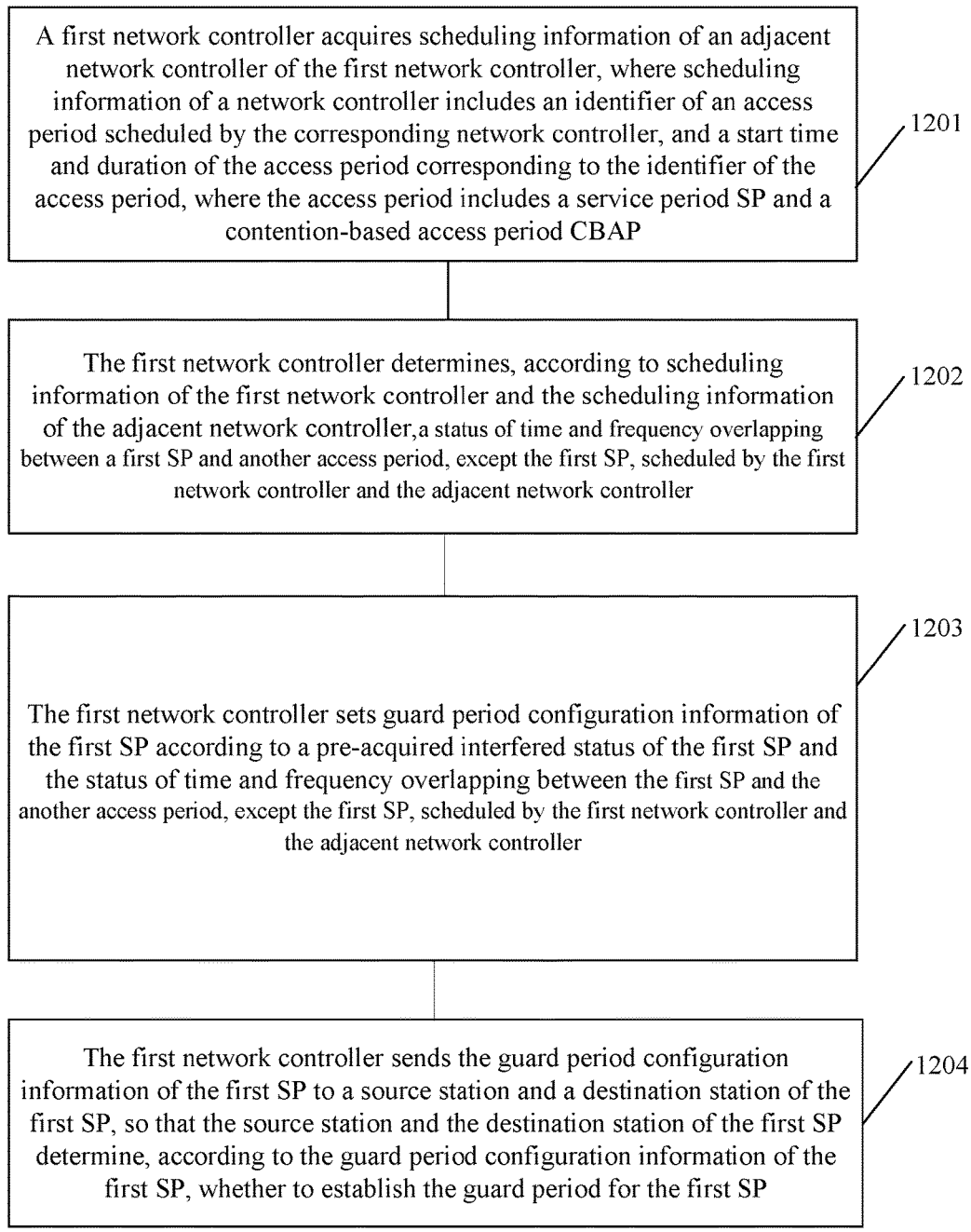
FIG. 12 is a flowchart of a method for establishing a guard period according to an embodiment of the present invention.

This embodiment provides a method for establishing a guard period. Referring to FIG. 12, the method includes the following.

1201. A first network controller acquires scheduling information of an adjacent network controller of the first network controller, where scheduling information of a network controller includes an identifier of an access period scheduled by the corresponding network controller, and a start time and duration of the access period corresponding to the identifier of the access period, where the access period includes a service period SP and a contention-based access period CBAP.

In this embodiment, the first network controller (current network controller) and the adjacent network controller are relative, and each network controller may be an adjacent network controller, or may be a first network controller (current network controller). In an example of an application scenario shown in FIG. 2, a first network controller is used as a current network controller, and a second network controller and a third network controller are adjacent network controllers of the first network controller.

The scheduling information of the network controller may be sent by using a DMG beacon frame or an Announce announcement frame. The scheduling information of the adjacent network controller may be directly received by the first network controller, or may be received by a station within a BSS in which the first network controller is located, and then uploaded to the first network controller in a form of an interference report.

Therefore, the receiving, by a first network controller, scheduling information of an adjacent network controller of the first network controller may include the following. The receiving, by a first network controller, scheduling information of an adjacent network controller of the first network controller may include: receiving the scheduling information sent by the adjacent network controller of the first network controller. Or, the receiving, by a first network controller, scheduling information of an adjacent network controller of the first network controller may include: receiving interference report information that is sent, by using a cluster report or a DMG service specification element, by a station within a BSS in which the first network controller is located; and acquiring the scheduling information of the adjacent network controller according to the interference report information.

1202. The first network controller determines, according to scheduling information of the first network controller and the scheduling information of the adjacent network controller, a status of time and frequency overlapping between a first SP and another access period, except the first SP, scheduled by the first network controller and the adjacent network controller.

The first network controller may acquire a start time and an end time of another SP according to the start time and duration of the another SP, and likewise, may acquire a start time and an end time of the first SP according to the start time and duration of the first SP. If a time period between a start time and an end time of a second SP intersects with a time period between the start time and the end time of the first SP, it indicates that time overlapping exists between the second SP and the first SP; on the contrary, if the time period between the start time and the end time of the second SP does not intersect with the time period between the start time and the end time of the first SP, it indicates that no time overlapping exists between the second SP and the first SP.

1203. The first network controller sets guard period configuration information of the first SP according to a pre-acquired interfered status of the first SP and the status of time and frequency overlapping between the first SP and the another access period, except the first SP, scheduled by the first network controller and the adjacent network controller.

The first network controller may determine, by requesting a pair of STAs to measure an SP and according to directional channel measurement results reported by the pair of STAs, whether the SP causes interference to the pair of STAs. For example, the first network controller allocates an SP1 and an SP2 to two pairs of STAs (which are respectively a STA A and a STA B, and a STA C and a STA D) within a BSS respectively. By using an existing spatial sharing mechanism of an SP in 802.11ad, the first network controller sends a directional channel quality request to the STA C and the STA D before the SP1 begins. When the STA A communicates with the STA B by means of beamforming within the SP1, the STA C and the STA D measure a directional channel between the STA C and the STA D. Likewise, the first network controller may also request the STA A and the STA B to measure a directional channel between the STA A and the STA B during the SP2. Within an ATI of a next BI, the first network controller may obtain directional channel quality measurement results of the STA C and the STA D within the SP1, and directional channel quality measurement results of the STA A and STA B within the SP2 respectively by polling the STA A and the STA B, and the STA C and the STA D. According to these measurement results, the first network controller may acquire a status of mutual interference generated when the SP1 overlaps with the SP2.

The guard period configuration information includes first indication information or second indication information, where the first indication information is used to indicate that a guard period needs to be established for the first SP, and the second indication information is used to indicate that the guard period is allowed to be established for the first SP.

The setting guard period configuration information of the first SP according to a pre-acquired interfered status of the first SP and the status of time and frequency overlapping between the first SP and the another access period, except the first SP, scheduled by the first network controller and the adjacent network controller may be implemented in the following several manners.

If it is determined that time and frequency overlapping exists between a first access period and the first SP in the another access period, except the first SP, scheduled by the first network controller and the adjacent network controller, and it cannot be determined, according to the pre-acquired interfered status of the first SP, that the first access period causes no interference to the first SP, the guard period configuration information of the first SP is set to the first indication information.

If it is determined that no time and frequency overlapping exists between a first access period and the first SP in the another access period, except the first SP, scheduled by the first network controller and the adjacent network controller, the guard period configuration information of the first SP is set to the second indication information.

If it is determined that time and frequency overlapping exists between a first access period and the first SP in the another access period, except the first SP, scheduled by the first network controller and the adjacent network controller, and it is determined, according to the pre-acquired interfered status of the first SP, that the first access period causes no interference to the first SP, the guard period configuration information of the first SP is set to the second indication information.

In this case, the guard period configuration information may be expressed by using one bit. For example, the first indication information may be expressed by using 1, and the second indication information may be expressed by using 0.

In China's spectrum planning and channel division, a case in which a large-bandwidth channel is divided into two small-bandwidth channels exists. For example, refer to FIG. 4A and FIG. 4B, which are respectively a schematic diagram of China's channel division at a 60 GHz frequency band and a schematic diagram of China's possible spectrum planning and channel division at a 45 GHz frequency band. In China, a case in which a large-bandwidth channel corresponds to two small-bandwidth channels exists at both the 60 GHz frequency band and the 45 GHz frequency band. As shown in FIG. 4A, a large-bandwidth channel 2 corresponds to two small-bandwidth channels 5 and 6, and a large-bandwidth channel 3 corresponds to two small-bandwidth channels 7 and 8. In this case, if time and frequency overlapping exists between a first SP and a second SP, channel interference generated when the first SP and the second SP are on different types of channels is different from channel interference generated when the first SP and the second SP are on a same type of channel. Therefore, preferably, in order to further enable a station to establish a guard period on a proper channel, the first network controller may further give an indication by configuring guard period configuration information of an SP.

The scheduling information further includes an allocation type of the access period, and the allocation type indicates a type of the access period and an allocated channel; and the first indication information includes any one of third indication information, or fourth indication information, or fifth indication information, so that a source station and a destination station of the first SP determine, according to the first indication information of the first SP, a channel on which the guard period established. In this embodiment of the present invention, the method described below may be applied to all scenarios in which a large-bandwidth channel corresponds to two small-bandwidth channels. Exemplarily, this embodiment is described only by using a scenario of 60 GHz in FIG. 4A, but this imposes no limitation on this embodiment of the present invention.

Correspondingly, the setting the guard period configuration information of the first SP to the first indication information includes the following several manners.

If it is determined that a channel of the first SP is the same as a channel of the first access period, the first indication information of the first SP is set to the third indication information, where the third indication information is used to instruct the source station and the destination station of the first SP to establish the guard period only on a current working channel.

For example, referring to FIG. 6, if the channel of the first SP is a channel 2, a type of the first access period is an SP that is herein referred to as a second SP, and a channel of the second SP is 2, because the channel of the first SP is the same as the channel of the second SP, the first network controller sets the first indication information to the third indication information, to instruct the source station and the destination station of the first SP to establish the guard period only on a current working channel (channel 2).

If it is determined that a channel of the first SP is a small-bandwidth channel, and a channel of the first access period is a large-bandwidth channel whose frequency overlaps with a frequency of the small-bandwidth channel of the first SP, the first indication information of the first SP is set to the fourth indication information, where the fourth indication information is used to instruct the source station and the destination station of the first SP to establish the guard period on a current working small-bandwidth channel, and establish the guard period on a large-bandwidth channel whose frequency overlaps with a current working small-bandwidth frequency.

For example, referring to FIG. 6, if the channel of the first SP is a channel 5, a type of the first access period is an SP that is herein referred to as a second SP, and a channel of the second SP is a channel 2, because the channel (channel 2) of the second SP is a large-bandwidth channel whose frequency overlaps with a frequency of the small-bandwidth channel (channel 5) of the first SP, the first indication information of the first SP is set to the fourth indication information, where the fourth indication information is used to instruct the source station and the destination station of the first SP to establish the guard period on a current working small-bandwidth channel (channel 5), and establish the guard period on a large-bandwidth channel (channel 2) whose frequency overlaps with a current working small-bandwidth frequency.

If it is determined that a channel of the first SP is a large-bandwidth channel, and a channel of the first access period is a low-frequency small-bandwidth channel whose frequency overlaps with a frequency of the large-bandwidth channel of the first SP, the first indication information of the first SP is set to the fourth indication information, where the fourth indication information is used to instruct the source station and the destination station of the first SP to establish the guard period on a current working large-bandwidth channel, and establish the guard period on a low-frequency small-bandwidth channel whose frequency overlaps with a frequency of the current working large-bandwidth channel.

For example, referring to FIG. 6, if the channel of the first SP is a channel 2, a type of the first access period is an SP that is herein referred to as a second SP, and a channel of the second SP is a channel 5, because the channel (channel 5) of the second SP is a low-frequency small-bandwidth channel whose frequency overlaps with a frequency of the large-bandwidth channel (channel 2) of the first SP, the first indication information of the first SP is set to the fourth indication information, where the fourth indication information is used to instruct the source station and the destination station of the first SP to establish the guard period on a current working large-bandwidth channel (channel 2), and establish the guard period on a low-frequency small-bandwidth channel (channel 5) whose frequency overlaps with a frequency of the current working large-bandwidth channel (channel 2).

If it is determined that a channel of the first SP is a large-bandwidth channel, and a channel of the first access period is a high-frequency small-bandwidth channel whose frequency overlaps with a frequency of the large-bandwidth channel of the first SP, the first indication information of the first SP is set to the fifth indication information, where the fifth indication information is used to instruct the source station and the destination station of the first SP to establish the guard period on a current working large-bandwidth channel, and establish the guard period on a high-frequency small-bandwidth channel whose frequency overlaps with a frequency of the current working large-bandwidth channel.

For example, referring to FIG. 6, if the channel of the first SP is a channel 2, a type of the first access period is an SP that is herein referred to as a second SP, and a channel of the second SP is a channel 6, because the channel (channel 6) of the second SP is a high-frequency small-bandwidth channel whose frequency overlaps with a frequency of the large-bandwidth channel (channel 2) of the first SP, the first indication information of the first SP is set to the fifth indication information, where the fifth indication information is used to instruct the source station and the destination station of the first SP to establish the guard period on a current working large-bandwidth channel (channel 2), and establish the guard period on a high-frequency small-bandwidth channel (channel 6) whose frequency overlaps with a frequency of the current working large-bandwidth channel (channel 2).

In this case, the guard period configuration information may be expressed by using two bits. For example, the second indication information may be expressed by using 00, and the third indication information, the fourth indication information, and the fifth indication information in the first indication information may be expressed by using 01, 10, and 11 respectively. Preferably, the guard period configuration information may be expressed by using a field in an extended scheduling element. Refer to FIG. 5A, which is a format of an allocation control field in an extended scheduling element in the prior art. It can be learned from FIG. 5A that the extended scheduling element in the prior art does not indicate information about whether to establish a guard period and on which channel the guard period needs to be established. Refer to FIG. 5B, which is a format of an allocation control field in an extended scheduling element according to an embodiment of the present invention. It can be learned from FIG. 5B that a guard period field including two bits (for example, B13 and B14) is added in the extended scheduling element in this embodiment of the present invention. For SP allocation, reference may be made to the foregoing method to configure a guard period, so as to indicate whether to establish the guard period and a channel on which the guard period established. For CBAP allocation, the guard period field is reserved.

In another implementation, an allocation type field in B4 to B6 in FIG. 5B may be used as a guard period indication field. A specific configuration may be shown in Table 1.

1204. The first network controller sends the guard period configuration information of the first SP to the source station and the destination station of the first SP, so that the source station and the destination station of the first SP determine, according to the guard period configuration information of the first SP, whether to establish the guard period for the first SP.

The sending, by the first network controller, the guard period configuration information of the first SP to the source station and the destination station of the first SP may include: sending an extended scheduling element of the first SP to the source station and the destination station of the first SP, where the extended scheduling element of the first SP includes the guard period configuration information of the first SP.

Further, preferably, the method further includes the following. If determining that guard periods need to be established for SPs that are respectively allocated to a first pair of stations and a second pair of stations, according to an allocation status of the SPs corresponding to the first pair of stations and the second pair of stations, setting directional channel quality measurement request elements and sending the directional channel quality measurement request elements to the first pair of stations and the second pair of stations respectively, so that directional channel quality measurement time periods indicated by the directional channel quality measurement request elements of the first pair of stations and the second pair of stations can cover listening mode time periods at start times of the corresponding SPs, and further the first pair of stations and the second pair of stations respectively point receive antennas to peer stations according to the directional channel quality measurement request elements, and complete directional channel quality measurement while channel listening required for establishing the guard periods is complete within the corresponding SPs.

The first network controller adjusts, by setting the directional channel quality measurement request elements of the first pair of stations and the second pair of stations, duration of the measurement time periods of the SPs corresponding to the first pair of stations and the second pair of stations, and data sending duration, so that an RTS/a DMG CTS handshake process of the first pair of stations and the second pair of stations for establishing the guard periods and data communication within the guard periods do not cause interference to an SP of another pair of stations.

For example, it is assumed that the first network controller first selects, according to beamforming training results of STAs, two pairs of STAs with a relatively small probability of mutual interference, that is, a STA A and a STA B, and a STA C and a STA D, to execute a "spatial sharing and interference suppression" function, with a purpose of performing directional channel measurement between the STA A and the STA B, and between the STA C and the STA D. If measurement results show that no mutual interference exists during directional communication between the STAs A and B, and between the STAs C and D, a PCP/an AP may allocate time-overlapped SPs to the STA A and the STA B, and the STA C and the STA D.

By using the newly added "guard period" field, in a process of establishing spatial sharing of an SP, the first network controller may combine a time of mutual directional channel measurement between two SPs and a required listening mode time in a guard period establishment process. "Spatial sharing and interference suppression" requires that a measurement method for performing directional channel measurement by a STA before SP overlapping is complete should be an ANIPI (average noise plus interference power indicator), but the STA also measures noise and interference of a channel when the STA is in a listening mode in a guard period establishment process. Therefore, the measurement process required by "spatial sharing and interference suppression" and the listening mode required for establishing a guard period may be combined in terms of time, thereby reducing time overheads.

The following describes this process by using a specific example. It is assumed that both an SP1 and an SP3 are allocated to a STA A and a STA B, while an SP2 is allocated to a STA C and a STA D, where no guard period needs to be established for the SP1, and guard periods need to be established for the SP2 and the SP3 because the SP2 and the SP3 may be interfered by an external network.

When the first network controller allocates the SP2 and the SP3, because the SP2 overlaps with the SP1, and the SP3 overlaps with the SP2, the first network controller cannot determine that the SP2 and the SP3 are free from interference. Therefore, the first network controller sets "guard period" fields of the SP2 and the SP3 to the first indication information according to a setting of the guard period field. In addition, the first network controller sets a "measurement duration" field in a channel quality measurement request element to duration of an overlapping part between the SP2 and the SP1.

In the "spatial sharing and interference suppression" mechanism, if a directional quality measurement time period in a measurement request element whose measurement type is Directional Channel Quality Request and that is sent by the first network controller covers a minimum time period required for establishing a guard period at a start time of an SP, owners of the SP2 and the SP3, that is, the STA C and the STA D, and the STA A and the STA B, may regard a measurement duration field in the measurement request element whose measurement type is Directional Channel Quality Request and that is requested by the first network controller, as a requirement of a listening mode time period required during guard period establishment; complete channel listening, which needs to be performed for guard period establishment, while directional channel measurement is complete; and report listening results by using measurement report elements whose measurement types are Directional Channel Quality Report. If the channel listening results are that a channel is idle, the STAs C and D, and the STAs A and B may directly perform RTS/DMG CTS handshake after the measurement time specified in the measurement request element whose measurement type is Directional Channel Quality Request ends, thereby reducing time overheads required for being in the listening mode during guard period establishment.

For example, refer to FIG. 6A. For example, the first network controller receives scheduling information of another network of a same channel, where the scheduling information shows that interference from communication of an adjacent BSS may exist within the SP2 and the SP3. Therefore, the guard periods need to be established for the SP2 and the SP3. For another example, in 802.11ad, when a "guard period" field in an ECPAC (extended centralized PCP/AP cluster) policy element is set to the first indication information, it is required that a guard period should be established for each SP. In a case in which a guard period needs to be established for an SP, the 802.11ad standard requires that source and destination STAs of the SP should be in the listening mode for at least 150 microseconds after the SP begins. Therefore, the listening mode is an inherent overhead in a guard period establishment process. With the foregoing method, the listening mode may also be used as a measurement time period in the "spatial sharing and interference suppression" mechanism, so that channel measurement required by "spatial sharing and interference suppression" is complete while channel listening is complete.

Further, the method further includes: receiving directional channel measurement results reported by the first pair of stations and the second pair of stations by using directional channel quality measurement report elements. If determining, according to the measurement results, that no mutual interference exists when the first pair of stations communicates with the second pair of stations, determining that time-overlapped SPs are allocated to the first pair of stations and the second pair of stations at the beginning of a next BI of a current beacon interval BI.

Referring to FIG. 6B, if the measurement results received by the first network controller show that no mutual interference exists during communication between the STAs A and B and the STAs C and D, time-overlapped SPs (an SP4 and an SP5 in FIG. 6B) are allocated to the STA A and the STA B, and the STA C and the STA D within a next BI.

Further, the method further includes: sending, by the first network controller, the scheduling information of the first network controller to the adjacent network controller of the first network controller, so that the adjacent network controller of the first network controller configures, according to the scheduling information of the first network controller, the scheduling information of the adjacent network controller, and a status, pre-acquired by the adjacent network controller, of interference between access periods, guard period configuration information of an SP scheduled by the adjacent network controller.

According to the method for establishing a guard period provided in this embodiment of the present invention, a first network controller acquires scheduling information of an adjacent network controller of the first network controller, where scheduling information of a network controller includes an identifier of an access period scheduled by the corresponding network controller, and a start time and duration of the access period corresponding to the identifier of the access period, where the access period includes a service period SP and a contention-based access period CBAP; determines, according to scheduling information of the first network controller and the scheduling information of the adjacent network controller, a status of time and frequency overlapping between a first SP and another access period, except the first SP, scheduled by the first network controller and the adjacent network controller; sets guard period configuration information of the first SP according to a pre-acquired interfered status of the first SP and the status of time and frequency overlapping between the first SP and the another access period, except the first SP, scheduled by the first network controller and the adjacent network controller, where the guard period configuration information includes first indication information or second indication information, the first indication information is used to indicate that a guard period needs to be established for the first SP, and the second indication information is used to indicate that the guard period is allowed to be established for the first SP; and then sends the guard period configuration information of the first SP to a source station and a destination station of the first SP, so that the source station and the destination station of the first SP determine, according to the guard period configuration information of the first SP, whether to establish the guard period for the first SP. It can be learned from the foregoing description that according to the method provided in this embodiment of the present invention, a first network controller can acquire scheduling information of an adjacent network controller; on a basis of having more comprehensive time-domain and frequency-domain scheduling information of an adjacent BSS, when allocating a first SP, indicate, according to a status of overlapping between another SP and the first SP, and a status of interference caused by the another SP to the first SP, whether to establish a guard period for the first SP; and then send corresponding indication information to a source station and a destination station of the first SP, so that the source station and the destination station of the first SP accurately determine when to establish the guard period, which reduces protection overheads, avoids interference, and overcomes defects in the prior art that protection overheads increase due to blind establishment of guard periods by a source station and a destination station of an SP, and interference is caused when no guard period is established due to missing scheduling information of an adjacent BSS.

Embodiment 4

Figure 13:
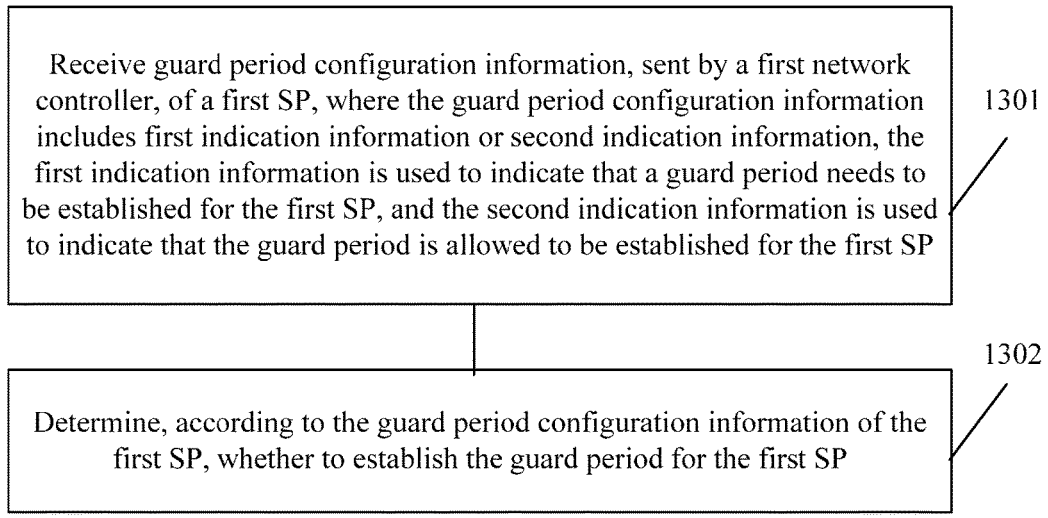
FIG. 13 is a flowchart of another method for establishing a guard period according to an embodiment of the present invention.

This embodiment provides a method for establishing a guard period. Referring to FIG. 13, the method includes the following.

1301. Receive guard period configuration information, sent by a first network controller, of a first SP, where the guard period configuration information includes first indication information or second indication information, the first indication information is used to indicate that a guard period needs to be established for the first SP, and the second indication information is used to indicate that the guard period is allowed to be established for the first SP.

1302. Determine, according to the guard period configuration information, received by the first receiving unit, of the first SP, whether to establish the guard period for the first SP.

Further, the method further includes: receiving scheduling information sent by an adjacent network controller of the first network controller, where the scheduling information of the adjacent network controller includes an identifier of an access period scheduled by the adjacent network controller, a start time and duration of the access period corresponding to the identifier of the access period, and a channel type of the access period, where the access period includes a service period SP and a contention-based access period CBAP.

If the guard period configuration information received by the first receiving unit is the second indication information, the first network controller belongs to a first cluster, and the first SP is allocated to the $n^{th}$ cluster time interval (ClusterTimeInter), the scheduling information of the adjacent network controller is received within each beacon service period (Beacon SP) by using a cluster mechanism.

Referring to FIG. 10, for example, if the first network controller is a synchronous network controller, and an SP1 is allocated to a ClusterTimeInterv 3, source and destination STAs of the SP1 need to listen on a channel within a Beacon SP2 corresponding to a ClusterTimeInterv 2, and attempt to receive scheduling information of a cluster member, that is, a second network controller.

Further, the method further includes: sending interference report information to the first network controller by using a cluster report or a DMG service specification element, where the interference report information includes the scheduling information sent by the adjacent network controller.

The determining, according to the guard period configuration information, received by the first receiving unit, of the first SP, whether to establish the guard period for the first SP includes the following. If the guard period configuration information is the first indication information, establishing the guard period for the first SP. If the guard period configuration information is the second indication information, and if it is determined, according to the scheduling information of the adjacent network controller, that time and frequency overlapping exists between a second access period and the first SP, and it cannot be determined that the second access period causes no interference to the first SP, establishing the guard period for the first SP. If the guard period configuration information is the second indication information, and if it is determined, according to the scheduling information of the adjacent network controller, that no time and frequency overlapping exists between a third SP and the first SP, skipping establishing the guard period for the first SP. If the guard period configuration information is the second indication information, and if it is determined, according to the scheduling information of the adjacent network controller, that time and frequency overlapping exists between a second access period and the first SP, and it cannot be determined that the second access period causes no interference to the first SP, establishing the guard period for the first SP.

In this case, the guard period configuration information may be expressed by using one bit. For example, the first indication information may be expressed by using 1, and the second indication information may be expressed by using 0.

Preferably, the first indication information includes any one of third indication information, or fourth indication information, or fifth indication information. In this case, the guard period configuration information may be expressed by using two bits. For example, the second indication information may be expressed by using 00, and the third indication information, the fourth indication information, and the fifth indication information in the first indication information may be expressed by using 01, 10, and 11 respectively. Preferably, the guard period configuration information may be expressed by using a field in an extended scheduling element. Refer to FIG. 5A, which is a format of an allocation control field in an extended scheduling element in the prior art. It can be learned from FIG. 5A that the extended scheduling element in the prior art does not indicate information about whether to establish a guard period and on which channel the guard period needs to be established. Refer to FIG. 5B, which is a format of an allocation control field in an extended scheduling element according to an embodiment of the present invention. It can be learned from FIG. 5B that a guard period field including two bits (for example, B13 and B14) is added in the extended scheduling element in this embodiment of the present invention.

In another implementation, an allocation type field in B4 to B6 in FIG. 5B may be used as a guard period indication field. A specific configuration may be shown in Table 1.

Correspondingly, the establishing the guard period for the first SP may be implemented in the following manners. If the first indication information of the first SP is the third indication information, establishing the guard period only on a current working channel. If the first indication information of the first SP is the fourth indication information and a station works on a small-bandwidth channel, establishing the guard period on a current working small-bandwidth channel of the station, and establishing the guard period on a large-bandwidth channel whose frequency overlaps with a current working small-bandwidth frequency. If the first indication information of the first SP is the fourth indication information and a station works on a large-bandwidth channel, establishing the guard period on a current working large-bandwidth channel of the station, and establishing the guard period on a low-frequency small-bandwidth channel whose frequency overlaps with a frequency of the current working large-bandwidth channel. If the first indication information of the first SP is the fifth indication information, establishing the guard period on a current working large-bandwidth channel, and establishing the guard period on a high-frequency small-bandwidth channel whose frequency overlaps with a frequency of the current working large-bandwidth channel.

The following separately describes guard period establishment processes in the foregoing various cases.

The establishing the guard period only on a current working channel includes: listening on the current working channel only; and if both a physical layer carrier sensing (CS) result and a virtual carrier sensing result show that the current working channel is idle, performing RTS/DMG CTS handshake on the current working channel.

A process of establishing the guard period on a current working small-bandwidth channel of the station, and establishing the guard period on a large-bandwidth channel whose frequency overlaps with a current working small-bandwidth frequency may be shown in FIG. 11A, and includes listening on the current working small-bandwidth channel of the station. If both a physical layer carrier sensing (CS) result and a virtual carrier sensing result show that the current working small-bandwidth channel is idle, performing RTS/DMG CTS handshake on the current working small-bandwidth channel. After the RTS/DMG CTS handshake interaction performed on the current working small-bandwidth channel is complete, performing RTS/DMG CTS handshake on the large-bandwidth channel whose frequency overlaps with the current working small-bandwidth frequency, where the two handshakes should be separated by a guard interval (GI)+short interframe space (SIFS), as indicated by a shadow slash part in FIG. 11B.

A process of establishing the guard period on a current working large-bandwidth channel of the station, and establishing the guard period on a low-frequency small-bandwidth channel whose frequency overlaps with a frequency of the current working large-bandwidth channel may be shown in FIG. 11C, and may include listening on the current working large-bandwidth channel of the station. If both a physical layer carrier sensing (CS) result and a virtual carrier sensing result show that the current working large-bandwidth channel of the station is idle, performing RTS/DMG CTS handshake on the current working large-bandwidth channel of the station. After the RTS/DMG CTS handshake interaction performed on the current working large-bandwidth channel of the station is complete, performing RTS/DMG CTS handshake on the low-frequency small-bandwidth channel whose frequency overlaps with the frequency of the current working large-bandwidth channel, where the two handshakes should be separated by a guard interval (GI)+short interframe space (SIFS), as indicated by a shadow slash part in FIG. 11C.

The establishing the guard period on a current working large-bandwidth channel, and establishing the guard period on a high-frequency small-bandwidth channel whose frequency overlaps with a frequency of the current working large-bandwidth channel may be shown in FIG. 11B, and includes listening on the current working large-bandwidth channel of the station. If both a physical layer carrier sensing (CS) result and a virtual carrier sensing result show that the current working large-bandwidth channel of the station is idle, performing RTS/DMG CTS handshake on the current working large-bandwidth channel of the station. After the RTS/DMG CTS handshake interaction performed on the current working large-bandwidth channel of the station is complete, performing RTS/DMG CTS handshake on the high-frequency small-bandwidth channel whose frequency overlaps with the frequency of the current working large-bandwidth channel, where the two handshakes should be separated by a guard interval (GI)+short interframe space (SIFS), as indicated by a shadow slash part in FIG. 11B.

Further, the method further includes: receiving a directional channel quality measurement request element sent by the first network controller, where a directional channel quality measurement time period indicated by the directional channel quality measurement request element covers a listening mode time period of an SP of the station, and channel measurement and channel listening are complete at the same time within the measurement time period; and pointing a receive antenna to a peer station according to the directional channel quality measurement request element, and completing directional channel quality measurement while channel listening required for establishing a guard period is complete within the corresponding SP.

By using the newly added "guard period" field, in a process of establishing spatial sharing of an SP, the first network controller may combine a time of mutual directional channel measurement between two SPs and a required listening mode time in a guard period establishment process. "Spatial sharing and interference suppression" requires that a measurement method for performing directional channel measurement by a STA before SP overlapping is complete should be an ANIPI (average noise plus interference power indicator), but the STA also measures noise and interference of a channel when the STA is in a listening mode in a guard period establishment process. Therefore, the measurement process required by "spatial sharing and interference suppression" and the listening mode required for establishing a guard period may be combined in terms of time, thereby reducing time overheads.

In the "spatial sharing and interference suppression" mechanism, if a directional quality measurement time period in a measurement request element whose measurement type is Directional Channel Quality Request and that is sent by the first network controller covers a minimum time period required for establishing a guard period at a start time of an SP, an owner STA of the SP may regard a measurement duration field in the measurement request element whose measurement type is Directional Channel Quality Request and that is requested by the first network controller, as a requirement of a listening mode time period required during guard period establishment; complete channel listening, which need to be performed for guard period establishment, while directional channel measurement is complete; and report a listening result by using a measurement report element whose measurement type is Directional Channel Quality Report. If the channel listening result is that a channel is idle, the STA may directly perform RTS/DMG CTS handshake after the measurement time specified in the measurement request element whose measurement type is Directional Channel Quality Request ends, thereby reducing time overheads required for being in the listening mode during guard period establishment.

Further, the method further includes: if both the physical layer carrier sensing (CS) result and the virtual carrier sensing result show that a channel is idle, directly performing RTS/DMG CTS handshake after the directional channel quality measurement time period indicated by the directional channel quality measurement request element ends.

Further, the method further includes: sending a directional channel quality measurement result to the first network controller by using the directional channel quality measurement report element, so that if determining, according to the measurement result, that no mutual interference exists between SPs of a first pair of stations and a second pair of stations, the first network controller determines that time-overlapped SPs are allocated to the first pair of stations and the second pair of stations within a next BI of a current beacon interval BI.

According to the method for establishing a guard period provided in this embodiment of the present invention, a station receives guard period configuration information, sent by a first network controller, of a first SP, where the guard period configuration information includes first indication information or second indication information, the first indication information is used to indicate that a guard period needs to be established for the first SP, and the second indication information indicates that the guard period is allowed to be established for the first SP; and then determines, according to the guard period configuration information of the first SP, whether to establish the guard period for the first SP. It can be learned from the foregoing description that according to the method for establishing a guard period provided in this embodiment of the present invention, a station can accurately determine, by receiving indication information sent by a first network controller, when to establish a guard period, which reduces protection overheads, avoids interference, and overcomes defects in the prior art that protection overheads increase due to blind establishment of guard periods by a source station and a destination station of an SP, and interference is caused when no guard period is established due to missing scheduling information of an adjacent BSS.

Embodiment 5

Figure 14:
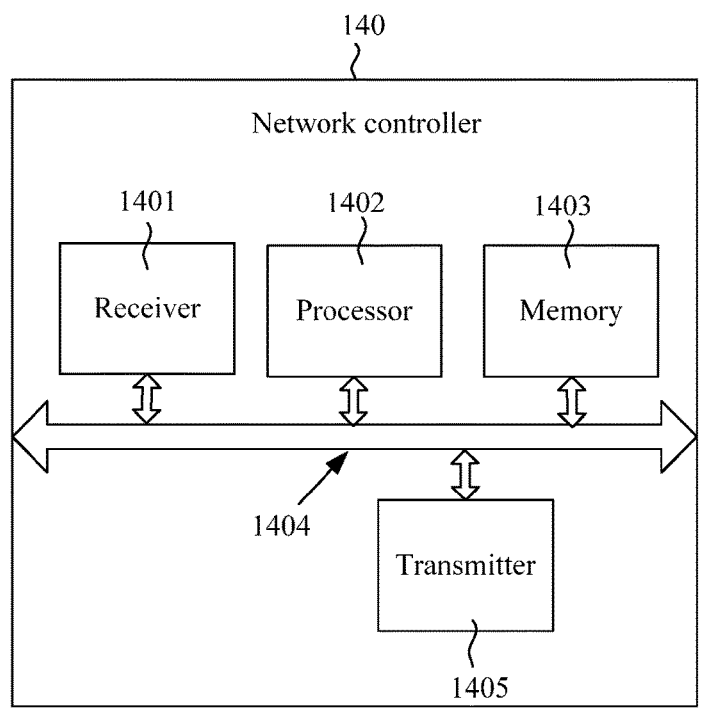
FIG. 14 is a schematic structural diagram of another network controller apparatus according to an embodiment of the present invention.

This embodiment of the present invention provides a network controller 140. Referring to FIG. 14, the network controller 140 includes a receiver 1401, a processor 1402, a transmitter 1405, a memory 1403, and a communications bus 1404 that is configured to implement connection communication between these apparatuses.

The communications bus 1404 may be an industry standard architecture (ISA) bus, a peripheral component interconnect (PCI) bus, an extended industry standard architecture (EISA) bus, or the like. The bus 1104 may be classified into an address bus, a data bus, a control bus, and the like.

For ease of representation, the bus is represented by using only one bold line in FIG. 14, which, however, does not mean that there is only one bus or one type of bus.

The memory 1403 is configured to store executable program code, where the program code includes a computer operation instruction. The memory 1403 may include a high-speed RAM memory, and may further include a non-volatile memory (non-volatile memory), such as at least one magnetic disk memory.

The processor 1402 may be a central processing unit (CPU) or an application-specific integrated circuit (ASIC), or is configured as one or more integrated circuits that implement this embodiment of the present invention.

The processor 1402 is configured to execute the executable program code stored in the memory 1403, for example, a computer program to run a program corresponding to executable code.

The receiver 1401 is configured to acquire scheduling information of an adjacent network controller of a first network controller, where scheduling information of a network controller includes an identifier of an access period scheduled by the corresponding network controller, and a start time and duration of the access period corresponding to the identifier of the access period, where the access period includes a service period SP and a contention-based access period CBAP.

The receiver 1401 may be configured to: receive the scheduling information sent by the adjacent network controller of the first network controller; or receive interference report information that is sent, by using a cluster report or a DMG service specification element, by a station within a BSS in which the first network controller is located; and acquire the scheduling information of the adjacent network controller according to the interference report information.

The scheduling information reported by the station within the BSS in which the first network controller is located may be scheduling information that is included in a beacon frame of an adjacent BSS and that is required to be reported in a cluster reporting method under a cluster mechanism, or may be scheduling information included when interference information is reported by using a traffic scheduling constraint (Traffic Scheduling Constraint, TSCONST) field.

The processor 1402 is configured to: determine, according to scheduling information of the first network controller and the scheduling information of the adjacent network controller, a status of time and frequency overlapping between a first SP and another access period, except the first SP, scheduled by the first network controller and the adjacent network controller; and set guard period configuration information of the first SP according to a pre-acquired interfered status of the first SP and the status, determined by the determining unit, of time and frequency overlapping between the first SP and the another access period, except the first SP, scheduled by the first network controller and the adjacent network controller.

The processor 1402 may acquire a start time and an end time of another SP according to the start time and duration of the another SP, and likewise, may acquire a start time and an end time of the first SP according to the start time and duration of the first SP. If a time period between a start time and an end time of a second SP intersects with a time period between the start time and the end time of the first SP, it indicates that time overlapping exists between the second SP and the first SP; on the contrary, if the time period between the start time and the end time of the second SP does not intersect with the time period between the start time and the end time of the first SP, it indicates that no time overlapping exists between the second SP and the first SP.

The first network controller may determine, by requesting a pair of STAs to measure an SP and according to directional channel measurement results reported by the pair of STAs, whether the SP causes interference to the pair of STAs. For example, the first network controller allocates an SP1 and an SP2 to two pairs of STAs (which are respectively a STA A and a STA B, and a STA C and a STA D) within a BSS respectively. By using an existing spatial sharing mechanism of an SP in 802.11ad, the first network controller sends a directional channel quality request to the STA C and the STA D before the SP1 begins. When the STA A communicates with the STA B by means of beamforming within the SP1, the STA C and the STA D measure a directional channel between the STA C and the STA D. Likewise, the first network controller may also request the STA A and the STA B to measure a directional channel between the STA A and the STA B during the SP2. Within an ATI of a next BI, the first network controller may obtain directional channel quality measurement results of the STA C and the STA D within the SP1, and directional channel quality measurement results of the STA A and STA B within the SP2 respectively by polling the STA A and the STA B, and the STA C and the STA D. According to these measurement results, the first network controller may acquire a status of mutual interference generated when the SP1 overlaps with the SP2.

The guard period configuration information includes first indication information or second indication information, where the first indication information is used to indicate that a guard period needs to be established for the first SP, and the second indication information is used to indicate that the guard period is allowed to be established for the first SP.

That the processor 1402 sets the guard period configuration information of the first SP according to the pre-acquired interfered status of the first SP and the status, determined by the determining unit, of time and frequency overlapping between the first SP and the another access period, except the first SP, scheduled by the first network controller and the adjacent network controller may be implemented in the following several manners.

If it is determined that time and frequency overlapping exists between a first access period and the first SP in the another access period, except the first SP, scheduled by the first network controller and the adjacent network controller, and it cannot be determined, according to the pre-acquired interfered status of the first SP, that the first access period causes no interference to the first SP, the guard period configuration information of the first SP is set to the first indication information.

If it is determined that no time and frequency overlapping exists between a first access period and the first SP in the another access period, except the first SP, scheduled by the first network controller and the adjacent network controller, the guard period configuration information of the first SP is set to the second indication information.

If it is determined that time and frequency overlapping exists between a first access period and the first SP in the another access period, except the first SP, scheduled by the first network controller and the adjacent network controller, and it is determined, according to the pre-acquired interfered status of the first SP, that the first access period causes no interference to the first SP, the guard period configuration information of the first SP is set to the second indication information.

In this case, the guard period configuration information may be expressed by using one bit. For example, the first indication information may be expressed by using 1, and the second indication information may be expressed by using 0.

In China's spectrum planning and channel division, a case in which a large channel large-bandwidth channel is divided into two small channel small-bandwidth channels exists. For example, refer to FIG. 4A and FIG. 4B, which are respectively a schematic diagram of China's channel division at a 60 GHz frequency band and a schematic diagram of China's possible spectrum planning and channel division at a 45 GHz frequency band. In China, a case in which a large channel large-bandwidth channel corresponds to two small channel small-bandwidth channels exists at both the 60 GHz frequency band and the 45 GHz frequency band. As shown in FIG. 4A, a large-bandwidth channel 2 corresponds to two small-bandwidth channels 5 and 6, and a large-bandwidth channel 3 corresponds to two small-bandwidth channels 7 and 8. In this case, if time and frequency overlapping exists between a first SP and a second SP, channel interference generated when the first SP and the second SP are on different types of channels is different from channel interference generated when the first SP and the second SP are on a same type of channel. Therefore, preferably, in order to further enable a station to establish a guard period on a proper channel, the first network controller may further give an indication by configuring guard period configuration information of an SP.

The scheduling information further includes an allocation type of the access period, and the allocation type indicates a type of the access period and an allocated channel; and the first indication information includes any one of third indication information, or fourth indication information, or fifth indication information, so that a source station and a destination station of the first SP determine, according to the first indication information of the first SP, a channel on which the guard period established. In this embodiment of the present invention, the method described below may be applied to all scenarios in which a large-bandwidth channel corresponds to two small-bandwidth channels. Exemplarily, this embodiment is described only by using a scenario of 60 GHz in FIG. 4A, but this imposes no limitation on this embodiment of the present invention.

Correspondingly, that the processor 1402 sets the guard period configuration information of the first SP to the first indication information includes the following several manners.

If it is determined that a channel of the first SP is the same as a channel of the first access period, the first indication information of the first SP is set to the third indication information, where the third indication information is used to instruct the source station and the destination station of the first SP to establish the guard period only on a current working channel.

For example, referring to FIG. 6, if the channel of the first SP is a channel 2, a type of the first access period is an SP that is herein referred to as a second SP, and a channel of the second SP is 2, because the channel of the first SP is the same as the channel of the second SP, the first network controller sets the first indication information to the third indication information, to instruct the source station and the destination station of the first SP to establish the guard period only on a current working channel (channel 2).

For another example, referring to FIG. 6, if the channel of the first SP is a channel 6, a type of the first access period is an SP that is herein referred to as a second SP, and a channel of the second SP is 6, because the channel of the first SP is the same as the channel of the second SP, the first network controller sets the first indication information to the third indication information, to instruct the source station and the destination station of the first SP to establish the guard period only on a current working channel (channel 6).

If it is determined that a channel of the first SP is a small-bandwidth channel, and a channel of the first access period is a large-bandwidth channel whose frequency overlaps with a frequency of the small-bandwidth channel of the first SP, the first indication information of the first SP is set to the fourth indication information, where the fourth indication information is used to instruct the source station and the destination station of the first SP to establish the guard period on a current working small-bandwidth channel, and establish the guard period on a large-bandwidth channel whose frequency overlaps with a current working small-bandwidth frequency.

For example, referring to FIG. 6, if the channel of the first SP is a channel 5, a type of the first access period is an SP that is herein referred to as a second SP, and a channel of the second SP is a channel 2, because the channel (channel 2) of the second SP is a large-bandwidth channel whose frequency overlaps with a frequency of the small-bandwidth channel (channel 5) of the first SP, the first indication information of the first SP is set to the fourth indication information, where the fourth indication information is used to instruct the source station and the destination station of the first SP to establish the guard period on a current working small-bandwidth channel (channel 5), and establish the guard period on a large-bandwidth channel (channel 2) whose frequency overlaps with a current working small-bandwidth frequency.

For another example, referring to FIG. 6, if the channel of the first SP is a channel 8, a type of the first access period is an SP that is herein referred to as a second SP, and a channel of the second SP is a channel 3, because the channel (channel 3) of the second SP is a large-bandwidth channel whose frequency overlaps with a frequency of the small-bandwidth channel (channel 8) of the first SP, the first indication information of the first SP is set to the fourth indication information, where the fourth indication information is used to instruct the source station and the destination station of the first SP to establish the guard period on a current working small-bandwidth channel (channel 8), and establish the guard period on a large-bandwidth channel (channel 3) whose frequency overlaps with a current working small-bandwidth frequency.

If it is determined that a channel of the first SP is a large-bandwidth channel, and a channel of the first access period is a low-frequency small-bandwidth channel whose frequency overlaps with a frequency of the large-bandwidth channel of the first SP, the first indication information of the first SP is set to the fourth indication information, where the fourth indication information is used to instruct the source station and the destination station of the first SP to establish the guard period on a current working large-bandwidth channel, and establish the guard period on a low-frequency small-bandwidth channel whose frequency overlaps with a frequency of the current working large-bandwidth channel.

For example, referring to FIG. 6, if the channel of the first SP is a channel 2, a type of the first access period is an SP that is herein referred to as a second SP, and a channel of the second SP is a channel 5, because the channel (channel 5) of the second SP is a low-frequency small-bandwidth channel whose frequency overlaps with a frequency of the large-bandwidth channel (channel 2) of the first SP, the first indication information of the first SP is set to the fourth indication information, where the fourth indication information is used to instruct the source station and the destination station of the first SP to establish the guard period on a current working large-bandwidth channel (channel 2), and establish the guard period on a low-frequency small-bandwidth channel (channel 5) whose frequency overlaps with a frequency of the current working large-bandwidth channel (channel 2).

For another example, referring to FIG. 6, if the channel of the first SP is a channel 3, a type of the first access period is an SP that is herein referred to as a second SP, and a channel of the second SP is a channel 7, because the channel (channel 7) of the second SP is a low-frequency small-bandwidth channel whose frequency overlaps with a frequency of the large-bandwidth channel (channel 3) of the first SP, the first indication information of the first SP is set to the fourth indication information, where the fourth indication information is used to instruct the source station and the destination station of the first SP to establish the guard period on a current working large-bandwidth channel (channel 3), and establish the guard period on a low-frequency small-bandwidth channel (channel 7) whose frequency overlaps with a frequency of the current working large-bandwidth channel (channel 3).

If it is determined that a channel of the first SP is a large-bandwidth channel, and a channel of the first access period is a high-frequency small-bandwidth channel whose frequency overlaps with a frequency of the large-bandwidth channel of the first SP, the first indication information of the first SP is set to the fifth indication information, where the fifth indication information is used to instruct the source station and the destination station of the first SP to establish the guard period on a current working large-bandwidth channel, and establish the guard period on a high-frequency small-bandwidth channel whose frequency overlaps with a frequency of the current working large-bandwidth channel.

For example, referring to FIG. 6, if the channel of the first SP is a channel 2, a type of the first access period is an SP that is herein referred to as a second SP, and a channel of the second SP is a channel 6, because the channel (channel 6) of the second SP is a high-frequency small-bandwidth channel whose frequency overlaps with a frequency of the large-bandwidth channel (channel 2) of the first SP, the first indication information of the first SP is set to the fifth indication information, where the fifth indication information is used to instruct the source station and the destination station of the first SP to establish the guard period on a current working large-bandwidth channel (channel 2), and establish the guard period on a high-frequency small-bandwidth channel (channel 6) whose frequency overlaps with a frequency of the current working large-bandwidth channel (channel 2).

For another example, referring to FIG. 6, if the channel of the first SP is a channel 3, a type of the first access period is an SP that is herein referred to as a second SP, and a channel of the second SP is a channel 8, because the channel (channel 8) of the second SP is a high-frequency small-bandwidth channel whose frequency overlaps with a frequency of the large-bandwidth channel (channel 3) of the first SP, the first indication information of the first SP is set to the fourth indication information, where the fourth indication information is used to instruct the source station and the destination station of the first SP to establish the guard period on a current working large-bandwidth channel (channel 3), and establish the guard period on a high-frequency small-bandwidth channel (channel 8) whose frequency overlaps with a frequency of the current working large-bandwidth channel (channel 3).

In this case, the guard period configuration information may be expressed by using two bits. For example, the second indication information may be expressed by using 00, and the third indication information, the fourth indication information, and the fifth indication information in the first indication information may be expressed by using 01, 10, and 11 respectively. Preferably, the guard period configuration information may be expressed by using a field in an extended scheduling element. Refer to FIG. 5A, which is a format of an allocation control field in an extended scheduling element in the prior art. It can be learned from FIG. 5A that the extended scheduling element in the prior art does not indicate information about whether to establish a guard period and on which channel the guard period needs to be established. Refer to FIG. 5B, which is a format of an allocation control field in an extended scheduling element according to an embodiment of the present invention. It can be learned from FIG. 5B that a guard period field including two bits (for example, B13 and B14) is added in the extended scheduling element in this embodiment of the present invention. For SP allocation, reference may be made to the foregoing method to configure a guard period, so as to indicate whether to establish the guard period and a channel on which the guard period established. For CBAP allocation, the guard period field is reserved.

In another implementation, an allocation type field in B4 to B6 in FIG. 5B may be used as a guard period indication field. A specific configuration may be shown in Table 1.

The transmitter 1405 is configured to send the guard period configuration information, configured by the scheduling unit, of the first SP to the source station and the destination station of the first SP, so that the source station and the destination station of the first SP determine, according to the guard period configuration information of the first SP, whether to establish the guard period for the first SP.

The transmitter 1405 is configured to send an extended scheduling element of the first SP to the source station and the destination station of the first SP, where the extended scheduling element of the first SP includes the guard period configuration information of the first SP.

Further, the processor 1402 is further configured to: if determining that guard periods need to be established for SPs that are respectively allocated to a first pair of stations and a second pair of stations, according to an allocation status of the SPs corresponding to the first pair of stations and the second pair of stations, set directional channel quality measurement request elements and send the directional channel quality measurement request elements to the first pair of stations and the second pair of stations respectively, so that directional channel quality measurement time periods indicated by the directional channel quality measurement request elements of the first pair of stations and the second pair of stations can cover listening mode time periods at start times of the corresponding SPs, and further the first pair of stations and the second pair of stations respectively point receive antennas to peer STAs according to the directional channel quality measurement request elements, and complete directional channel quality measurement while channel listening for establishing the guard periods of the corresponding SPs is complete.

The first network controller adjusts, by setting the directional channel quality measurement request elements of the first pair of stations and the second pair of stations, duration of the measurement time periods of the SPs corresponding to the first pair of stations and the second pair of stations, and data sending duration, so that an RTS/a DMG CTS handshake process of the first pair of stations and the second pair of stations for establishing the guard periods and data communication within the guard periods do not cause interference to an SP of another pair of stations.

For example, it is assumed that the first network controller first selects, according to beamforming training results of STAs, two pairs of STAs with a relatively small probability of mutual interference, that is, a STA A and a STA B, and a STA C and a STA D, to execute a "spatial sharing and interference suppression" function, with a purpose of performing directional channel measurement between the STA A and the STA B, and between the STA C and the STA D. If measurement results show that no mutual interference exists during directional communication between the STAs A and B, and between the STAs C and D, a PCP/an AP may allocate time-overlapped SPs to the STA A and the STA B, and the STA C and the STA D.

By using the newly added "guard period" field, in a process of establishing spatial sharing of an SP, the first network controller may combine a time of mutual directional channel measurement between two SPs and a required listening mode time in a guard period establishment process. "Spatial sharing and interference suppression" requires that a measurement method for performing directional channel measurement by a STA before SP overlapping is complete should be an ANIPI (average noise plus interference power indicator), but the STA also measures noise and interference of a channel when the STA is in a listening mode in a guard period establishment process. Therefore, the measurement process required by "spatial sharing and interference suppression" and the listening mode required for establishing a guard period may be combined in terms of time, thereby reducing time overheads.

The following describes this process by using a specific example. It is assumed that both an SP1 and an SP3 are allocated to a STA A and a STA B, while an SP2 is allocated to a STA C and a STA D, where no guard period needs to be established for the SP1, and guard periods need to be established for the SP2 and the SP3 because the SP2 and the SP3 may be interfered by an external network.

When the first network controller allocates the SP2 and the SP3, because the SP2 overlaps with the SP1, and the SP3 overlaps with the SP2, the first network controller cannot determine that the SP2 and the SP3 are free from interference. Therefore, the first network controller sets "guard period" fields of the SP2 and the SP3 to the first indication information according to a setting of the guard period field. In addition, the first network controller sets a "measurement duration" field in a channel quality measurement request element to duration of an overlapping part between the SP2 and the SP1.

In the "spatial sharing and interference suppression" mechanism, if a directional quality measurement time period in a measurement request element whose measurement type is Directional Channel Quality Request and that is sent by the first network controller covers a minimum time period required for establishing a guard period at a start time of an SP, owners of the SP2 and the SP3, that is, the STA C and the STA D, and the STA A and the STA B, may regard a measurement duration field in the measurement request element whose measurement type is Directional Channel Quality Request and that is requested by the first network controller, as a requirement of a listening mode time period required during guard period establishment; complete channel listening, which needs to be performed for guard period establishment, while directional channel measurement is complete; and report listening results by using measurement report elements whose measurement types are Directional Channel Quality Report. If the channel listening results are that a channel is idle, the STAs C and D, and the STAs A and B may directly perform RTS/DMG CTS handshake after the measurement time specified in the measurement request element whose measurement type is Directional Channel Quality Request ends, thereby reducing time overheads required for being in the listening mode during guard period establishment.

For example, referring to FIG. 6A, the first network controller receives scheduling information of another network of a same channel, where the scheduling information shows that interference from communication of an adjacent BSS may exist within the SP2 and the SP3. Therefore, the guard periods need to be established for the SP2 and the SP3. For another example, in 802.11ad, when a "guard period" field in an ECPAC (extended centralized PCP/AP cluster) policy element is set to the first indication information, it is required that a guard period should be established for each SP. In a case in which a guard period needs to be established for an SP, the 802.11ad standard requires that source and destination STAs of the SP should be in the listening mode for at least 150 microseconds after the SP begins. Therefore, the listening mode is an inherent overhead in a guard period establishment process. With the foregoing method, the listening mode may also be used as a measurement time period in the "spatial sharing and interference suppression" mechanism, so that the source and destination STAs of the SP complete, while completing channel listening, channel measurement required by "spatial sharing and interference suppression".

Further, the receiver 1401 is further configured to receive directional channel measurement results reported by the first pair of stations and the second pair of stations by using directional channel quality measurement report elements.

The processor 1402 is further configured to: if determining, according to the measurement results, that no mutual interference exists when the first pair of stations communicates with the second pair of stations, determine that time-overlapped SPs are allocated to the first pair of stations and the second pair of stations at the beginning of a next BI of a current beacon interval BI.

Referring to FIG. 6B, if the measurement results received by the first network controller show that no mutual interference exists during communication between the STAs A and B and the STAs C and D, time-overlapped SPs (an SP4 and an SP5 in FIG. 6B) are allocated to the STA A and the STA B, and the STA C and the STA D within a next BI.

Further, the transmitter 1405 is further configured to send the scheduling information of the first network controller to the adjacent network controller of the first network controller, so that the adjacent network controller of the first network controller configures, according to the scheduling information of the first network controller, the scheduling information of the adjacent network controller, and a status, pre-acquired by the adjacent network controller, of interference between access periods, guard period configuration information of an SP scheduled by the adjacent network controller.

According to the network controller provided in this embodiment of the present invention, the network controller includes: a receiver, configured to acquire scheduling information of an adjacent network controller of a first network controller, where scheduling information of a network controller includes an identifier of an access period scheduled by the corresponding network controller, and a start time and duration of the access period corresponding to the identifier of the access period, where the access period includes a service period SP and a contention-based access period CBAP; a processor, configured to determine, according to scheduling information of the first network controller and the scheduling information, acquired by the acquiring unit, of the adjacent network controller, a status of time and frequency overlapping between a first SP and another access period, except the first SP, scheduled by the first network controller and the adjacent network controller, and set guard period configuration information of the first SP according to a pre-acquired interfered status of the first SP and the status, determined by the determining unit, of time and frequency overlapping between the first SP and the another access period, except the first SP, scheduled by the first network controller and the adjacent network controller, where the guard period configuration information includes first indication information or second indication information, the first indication information is used to indicate that a guard period needs to be established for the first SP, and the second indication information is used to indicate that the guard period is allowed to be established for the first SP; and a transmitter, configured to send the guard period configuration information, configured by the scheduling unit, of the first SP to a source station and a destination station of the first SP, so that the source station and the destination station of the first SP determine, according to the guard period configuration information of the first SP, whether to establish the guard period for the first SP.

Embodiment 6

Figure 15:
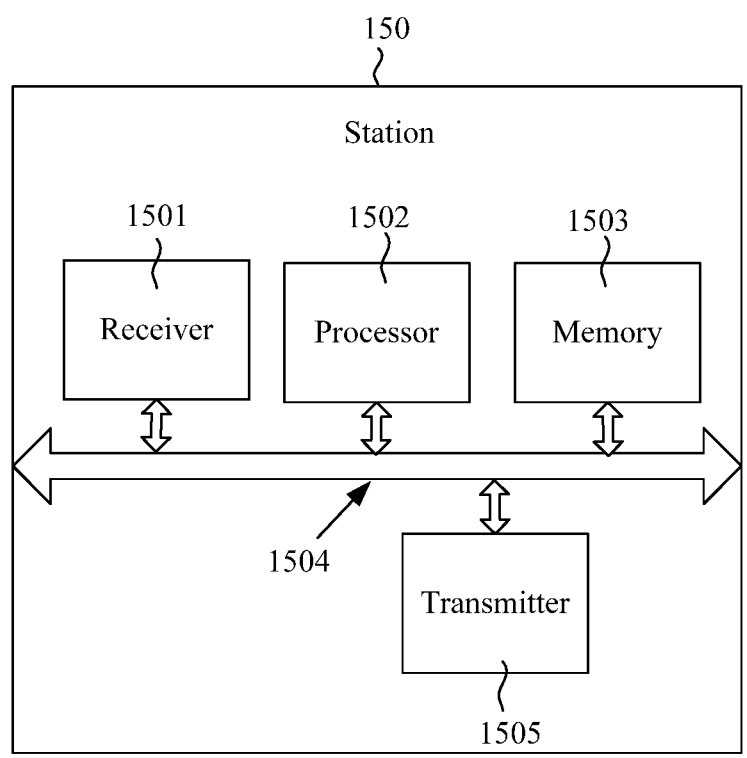
FIG. 15 is a schematic structural diagram of another station apparatus according to an embodiment of the present invention.

This embodiment provides a station 150. Referring to FIG. 15, the station 150 includes a receiver 1501, a processor 1502, a memory 1503, and a communications bus 1504 that is configured to implement connection communication between these apparatuses.

The communications bus 1504 may be an industry standard architecture (ISA) bus, a peripheral component interconnect (PCI) bus, an extended industry standard architecture (EISA) bus, or the like. The bus 1104 may be classified into an address bus, a data bus, a control bus, and the like. For ease of representation, the bus is represented by using only one bold line in FIG. 15, which, however, does not mean that there is only one bus or one type of bus.

The memory 1503 is configured to store executable program code, where the program code includes a computer operation instruction. The memory 1503 may include a high-speed RAM memory, and may further include a non-volatile memory (non-volatile memory), such as at least one magnetic disk memory.

The processor 1502 may be a central processing unit (CPU) or an application-specific integrated circuit (ASIC), or is configured as one or more integrated circuits that implement this embodiment of the present invention.

The processor 1502 is configured to execute the executable program code stored in the memory 1503, for example, a computer program to run a program corresponding to executable code.

The receiver 1501 is configured to receive guard period configuration information, sent by a first network controller, of a first SP, where the guard period configuration information includes first indication information or second indication information, the first indication information is used to indicate that a guard period needs to be established for the first SP, and the second indication information is used to indicate that the guard period is allowed to be established for the first SP.

The processor 1502 is configured to determine, according to the guard period configuration information of the first SP, whether to establish the guard period for the first SP.

Further, the receiver 1501 is further configured to receive scheduling information sent by an adjacent network controller of the first network controller, where the scheduling information of the adjacent network controller includes an identifier of an access period scheduled by the adjacent network controller, a start time and duration of the access period corresponding to the identifier of the access period, and a channel type of the access period, where the access period includes a service period SP and a contention-based access period CBAP.

If the guard period configuration information received by the receiver 1501 is the second indication information, the first network controller belongs to a first cluster, and the first SP is allocated to the $n^{th}$ cluster time interval (ClusterTimeInter), that the receiver 1501 receives the scheduling information sent by the adjacent network controller of the first network controller includes the receiver 1501 receiving the scheduling information of the adjacent network controller within each beacon service period (Beacon SP) by using a cluster mechanism.

Referring to FIG. 10, for example, if the first network controller is a synchronous network controller, and an SP1 is allocated to a ClusterTimeInterv 3, source and destination STAs of the SP1 need to listen on a channel within a Beacon SP2 corresponding to a ClusterTimeInterv 2, and attempt to receive scheduling information of a cluster member, that is, a second network controller.

Further, the station 150 may further include: a transmitter 1505, configured to send interference report information to the first network controller by using a cluster report or a DMG service specification element, where the interference report information includes the scheduling information sent by the adjacent network controller.

The processor 1502 is configured to perform the following. If the guard period configuration information is the first indication information, establish the guard period for the first SP. If the guard period configuration information is the second indication information, and if it is determined, according to the scheduling information of the adjacent network controller received by the second receiving unit, that time and frequency overlapping exists between a second access period and the first SP, and it cannot be determined that the second access period causes no interference to the first SP, establish the guard period for the first SP. If the guard period configuration information is the second indication information, and if it is determined, according to the scheduling information of the adjacent network controller received by the second receiving unit, that no time and frequency overlapping exists between a third SP and the first SP, skip establishing the guard period for the first SP. If the guard period configuration information is the second indication information, and if it is determined, according to the scheduling information of the adjacent network controller received by the second receiving unit, that time and frequency overlapping exists between a second access period and the first SP, and it cannot be determined that the second access period causes no interference to the first SP, establish the guard period for the first SP.

In this case, the guard period configuration information may be expressed by using one bit. For example, the first indication information may be expressed by using 1, and the second indication information may be expressed by using 0.

Preferably, the first indication information includes any one of third indication information, or fourth indication information, or fifth indication information. In this case, the guard period configuration information may be expressed by using two bits. For example, the second indication information may be expressed by using 00, and the third indication information, the fourth indication information, and the fifth indication information in the first indication information may be expressed by using 01, 10, and 11 respectively. Preferably, the guard period configuration information may be expressed by using a field in an extended scheduling element. Refer to FIG. 5A, which is a format of an allocation control field in an extended scheduling element in the prior art. It can be learned from FIG. 5A that the extended scheduling element in the prior art does not indicate information about whether to establish a guard period and on which channel the guard period needs to be established. Refer to FIG. 5B, which is a format of an allocation control field in an extended scheduling element according to an embodiment of the present invention. It can be learned from FIG. 5B that a guard period field including two bits (for example, B13 and B14) is added in the extended scheduling element in this embodiment of the present invention.

In another implementation, an allocation type field in B4 to B6 in FIG. 5B may be used as a guard period indication field. A specific configuration may be shown in Table 1.

Correspondingly, that the processor 1502 establishes the guard period for the first SP may be implemented in the following manners. If the first indication information of the first SP is the third indication information, establishing the guard period only on a current working channel. If the first indication information of the first SP is the fourth indication information and the station works on a small-bandwidth channel, establishing the guard period on a current working small-bandwidth channel of the station, and establishing the guard period on a large-bandwidth channel whose frequency overlaps with a current working small-bandwidth frequency. If the first indication information of the first SP is the fourth indication information and the station works on a large-bandwidth channel, establishing the guard period on a current working large-bandwidth channel of the station, and establishing the guard period on a low-frequency small-bandwidth channel whose frequency overlaps with a frequency of the current working large-bandwidth channel. If the first indication information of the first SP is the fifth indication information, establishing the guard period on a current working large-bandwidth channel, and establishing the guard period on a high-frequency small-bandwidth channel whose frequency overlaps with a frequency of the current working large-bandwidth channel.

The following separately describes guard period establishment processes in the foregoing various cases.

That the processor 1502 establishes the guard period only on the current working channel includes listening on the current working channel only; and if both a physical layer carrier sensing (CS) result and a virtual carrier sensing result show that the current working channel is idle, performing RTS/DMG CTS handshake on the current working channel.

A process in which the processor 1502 establishes the guard period on the current working small-bandwidth channel of the station, and establishes the guard period on the large-bandwidth channel whose frequency overlaps with the current working small-bandwidth frequency may be shown in FIG. 11A, and includes listening on the current working small-bandwidth channel of the station. If both a physical layer carrier sensing (CS) result and a virtual carrier sensing result show that the current working small-bandwidth channel is idle, performing RTS/DMG CTS handshake on the current working small-bandwidth channel. After the RTS/DMG CTS handshake interaction performed on the current working small-bandwidth channel is complete, performing RTS/DMG CTS handshake on the large-bandwidth channel whose frequency overlaps with the current working small-bandwidth frequency, where the two handshakes should be separated by a guard interval (GI)+short interframe space (SIFS), as indicated by a shadow slash part in FIG. 11B.

A process in which the processor 1502 establishes the guard period on the current working large-bandwidth channel of the station, and establishes the guard period on the low-frequency small-bandwidth channel whose frequency overlaps with the frequency of the current working large-bandwidth channel may be shown in FIG. 11C, and may include listening on the current working large-bandwidth channel of the station. If both a physical layer carrier sensing (CS) result and a virtual carrier sensing result show that the current working large-bandwidth channel of the station is idle, performing RTS/DMG CTS handshake on the current working large-bandwidth channel of the station. After the RTS/DMG CTS handshake interaction performed on the current working large-bandwidth channel of the station is complete, performing RTS/DMG CTS handshake on the low-frequency small-bandwidth channel whose frequency overlaps with the frequency of the current working large-bandwidth channel, where the two handshakes should be separated by a guard interval (GI)+short interframe space (SIFS), as indicated by a shadow slash part in FIG. 11C.

That the processor 1502 establishes the guard period on the current working large-bandwidth channel, and establishes the guard period on the high-frequency small-bandwidth channel whose frequency overlaps with the frequency of the current working large-bandwidth channel may be shown in FIG. 11B, and includes listening on the current working large-bandwidth channel of the station. If both a physical layer carrier sensing (CS) result and a virtual carrier sensing result show that the current working large-bandwidth channel of the station is idle, performing RTS/DMG CTS handshake on the current working large-bandwidth channel of the station. After the RTS/DMG CTS handshake interaction performed on the current working large-bandwidth channel of the station is complete, performing RTS/DMG CTS handshake on the high-frequency small-bandwidth channel whose frequency overlaps with the frequency of the current working large-bandwidth channel, where the two handshakes should be separated by a guard interval (GI)+short interframe space (SIFS), as indicated by a shadow slash part in FIG. 11B.

Preferably, the guard period configuration information is expressed by using a field in an extended scheduling element.

Correspondingly, the receiver 1501 is further configured to receive an extended scheduling element, sent by the first network controller, of the first SP, where the extended scheduling element of the first SP includes the guard period configuration information of the first SP.

Further, the receiver 1501 is further configured to receive a directional channel quality measurement request element sent by the first network controller, where a directional channel quality measurement time period indicated by the directional channel quality measurement request element covers a listening mode time period of an SP of the station, and channel measurement and channel listening are complete at the same time within the measurement time period.

By using the newly added "guard period" field, in a process of establishing spatial sharing of an SP, the first network controller may combine a time of mutual directional channel measurement between two SPs and a required listening mode time in a guard period establishment process. "Spatial sharing and interference suppression" requires that a measurement method for performing directional channel measurement by a STA before SP overlapping is complete should be an ANIPI (average noise plus interference power indicator), but the STA also measures noise and interference of a channel when the STA is in a listening mode in a guard period establishment process. Therefore, the measurement process required by "spatial sharing and interference suppression" and the listening mode required for establishing a guard period may be combined in terms of time, thereby reducing time overheads.

The processor 1502 is further configured to point a receive antenna to a peer station according to the directional channel quality measurement request element, and complete directional channel quality measurement while channel listening required for establishing a guard period is complete within the corresponding SP.

In the "spatial sharing and interference suppression" mechanism, if a directional quality measurement time period in a measurement request element whose measurement type is Directional Channel Quality Request and that is sent by the first network controller covers a minimum time period required for establishing a guard period at a start time of an SP, an owner STA of the SP may regard a measurement duration field in the measurement request element whose measurement type is Directional Channel Quality Request and that is requested by the first network controller, as a requirement of a listening mode time period required during guard period establishment; complete channel listening, which needs to be performed for guard period establishment, while directional channel measurement is complete; and report a listening result by using a measurement report element whose measurement type is Directional Channel Quality Report. If the channel listening result is that a channel is idle, the STA may directly perform RTS/DMG CTS handshake after the measurement time specified in the measurement request element whose measurement type is Directional Channel Quality Request ends, thereby reducing time overheads required for being in the listening mode during guard period establishment.

Further, the processor 1502 is further configured to: if both the physical layer carrier sensing (CS) result and the virtual carrier sensing result show that a channel is idle, directly perform RTS/DMG CTS handshake after the directional channel quality measurement time period indicated by the directional channel quality measurement request element ends.

Further, the transmitter 1505 is further configured to send a directional channel quality measurement result to the first network controller by using the directional channel quality measurement report element, so that if determining, according to the measurement result, that no mutual interference exists between SPs of a first pair of stations and a second pair of stations, the first network controller determines that time-overlapped SPs are allocated to the first pair of stations and the second pair of stations within a next BI of a current beacon interval BI.

According to the station provided in this embodiment of the present invention, the station includes: a receiver, configured to receive guard period configuration information, sent by a first network controller, of a first SP, where the guard period configuration information includes first indication information or second indication information, the first indication information is used to indicate that a guard period needs to be established for the first SP, and the second indication information indicates that the guard period is allowed to be established for the first SP; and a processor, configured to determine, according to the guard period configuration information, received by the receiver, of the first SP, whether to establish the guard period for the first SP. It can be learned from the foregoing description that the station provided in this embodiment of the present invention can accurately determine, by receiving indication information sent by a first network controller, when to establish a guard period, which reduces protection overheads, avoids interference, and overcomes defects in the prior art that protection overheads increase due to blind establishment of guard periods by a source station and a destination station of an SP, and interference is caused when no guard period is established due to missing scheduling information of an adjacent BSS.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) to perform some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

Finally, it should be noted that the foregoing embodiments are merely intended for describing the technical solutions of the present disclosure but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, but these modifications or replacements shall not make the corresponding technical solutions depart from the spirit and scope of the technical solutions of the embodiments of the present invention.

What is claimed is:

1. A method, comprising:
acquiring, by a first network controller, scheduling information of an adjacent network controller of the first network controller, wherein scheduling information of a network controller comprises an identifier of an access period scheduled by the corresponding network controller, and a start time and duration of the access period corresponding to the identifier of the access period, wherein the access period comprises a service period (SP) and a contention-based access period (CBAP);
determining, by the first network controller according to scheduling information of the first network controller and the scheduling information of the adjacent network controller, a status of time and frequency overlapping between a first SP and another access period, except the first SP, scheduled by the first network controller and the adjacent network controller;
setting, by the first network controller, guard period configuration information of the first SP according to a pre-acquired interfered status of the first SP and the status of time and frequency overlapping between the first SP and the other access period, except the first SP, scheduled by the first network controller and the adjacent network controller, wherein the guard period configuration information comprises first indication information or second indication information, wherein the first indication information is used to indicate that a guard period needs to be established for the first SP, and wherein the second indication information is used to indicate that the guard period is allowed to be established for the first SP; and
sending, by the first network controller, the guard period configuration information of the first SP to a source station and a destination station of the first SP, so that the source station and the destination station of the first SP determine, according to the guard period configuration information of the first SP, whether to establish the guard period for the first SP.

2. The method according to claim 1, wherein the setting, by the first network controller, guard period configuration information of the first SP according to a pre-acquired interfered status of the first SP and the status of time and frequency overlapping between the first SP and the other access period, except the first SP, scheduled by the first network controller and the adjacent network controller comprises:
setting the guard period configuration information of the first SP to the first indication information in response to a determination that time and frequency overlapping exists between a first access period and the first SP in the other access period, except the first SP, scheduled by the first network controller and the adjacent network controller, and it cannot be determined, according to the pre-acquired interfered status of the first SP, that the first access period causes no interference to the first SP; or
setting the guard period configuration information of the first SP to the second indication information in response to a determination that no time and frequency overlapping exists between a first access period and the first SP in the other access period, except the first SP, scheduled by the first network controller and the adjacent network controller; or
setting the guard period configuration information of the first SP to the second indication information in response to a determination that time and frequency overlapping exists between a first access period and the first SP in the other access period, except the first SP, scheduled by the first network controller and the adjacent network controller, and it is determined, according to the pre-acquired interfered status of the first SP, that the first access period causes no interference to the first SP.

3. The method according to claim 2, wherein the scheduling information further further comprises an allocation type of the access period, and the allocation type indicates a type of the access period and an allocated channel, wherein the first indication information comprises any one of third indication information, or fourth indication information, or fifth indication information, so that the source station and the destination station of the first SP determine, according to the first indication information of the first SP, a channel on which the guard period established, and
wherein the setting the guard period configuration information of the first SP to the first indication information comprises:
setting the first indication information of the first SP to the third indication information in response to a determination that a channel of the first SP is the same as a channel of the first access period, wherein the third indication information is used to instruct the source station and the destination station of the first SP to establish the guard period only on a current working channel; or
setting the first indication information of the first SP to the fourth indication information in response to a determination that a channel of the first SP is a small-bandwidth channel, and a channel of the first access period is a large-bandwidth channel whose frequency overlaps with a frequency of the small-bandwidth channel of the first SP, wherein the fourth indication information is used to instruct the source station and the destination station of the first SP to establish the guard period on a current working small-bandwidth channel, and establish the guard period on a large-bandwidth channel whose frequency overlaps with a current working small-bandwidth frequency; or
setting the first indication information of the first SP to the fourth indication information in response to a determination that a channel of the first SP is a large-bandwidth channel, and a channel of the first access period is a low-frequency small-bandwidth channel whose frequency overlaps with a frequency of the large-bandwidth channel of the first SP, wherein the fourth indication information is used to instruct the source station and the destination station of the first SP to establish the guard period on a current working large-bandwidth channel, and establish the guard period on a low-frequency small-bandwidth channel whose frequency overlaps with a frequency of the current working large-bandwidth channel; or
setting the first indication information of the first SP to the fifth indication information in response to a determination that a channel of the first SP is a large-bandwidth channel, and a channel of the first access period is a high-frequency small-bandwidth channel whose frequency overlaps with a frequency of the large-bandwidth channel of the first SP, wherein the fifth indication information is used to instruct the source station and the destination station of the first SP to establish the guard period on a current working large-bandwidth channel, and establish the guard period on a high-frequency small-bandwidth channel whose frequency overlaps with a frequency of the current working large-bandwidth channel.

4. The method according to claim 1, wherein the acquiring, by a first network controller, scheduling information of an adjacent network controller of the first network controller comprises:
receiving, by the first network controller, the scheduling information sent by the adjacent network controller of the first network controller; or
receiving, by the first network controller, interference report information that is sent, by using a cluster report or a DMG service specification element, by a station within a basic service set BSS in which the first network controller is located; and
acquiring the scheduling information of the adjacent network controller according to the interference report information.

5. The method according to claim 1, further comprising:
in response to a determination that guard periods need to be established for SPs that are respectively allocated to a first pair of stations and a second pair of stations, according to an allocation status of the SPs corresponding to the first pair of stations and the second pair of stations, setting directional channel quality measurement request elements and sending the directional channel quality measurement request elements to the first pair of stations and the second pair of stations respectively, so that directional channel quality measurement time periods indicated by the directional channel quality measurement request elements of the first pair of stations and the second pair of stations can cover listening mode time periods at start times of the corresponding SPs, and further the first pair of stations and the second pair of stations respectively point receive antennas to peer stations according to the directional channel quality measurement request elements, and complete directional channel quality measurement while channel listening required for establishing the guard periods is complete within the corresponding SPs.

6. A non-transitory computer-readable storage medium comprising instructions which, when executed by a computer, cause the computer to carry out the method of claim 1.

7. A method, comprising:
receiving scheduling information sent by an adjacent network controller of a first network controller, wherein the scheduling information of the adjacent network controller comprises an identifier of an access period scheduled by the adjacent network controller, a start time and duration of the access period corresponding to the identifier of the access period, and a channel type of the access period, wherein the access period comprises a service period (SP) and a contention-based access period (CBAP);
sending interference report information to the first network controller by using a cluster report or a DMG service specification element, wherein the interference report information comprises the scheduling information sent by the adjacent network controller;
receiving guard period configuration information, sent by the first network controller, of a first SP, wherein the guard period configuration information comprises first indication information or second indication information, wherein the first indication information is used to indicate that a guard period needs to be established for the first SP, and wherein the second indication information is used to indicate that the guard period is allowed to be established for the first SP; and
determining, according to the guard period configuration information of the first SP, whether to establish the guard period for the first SP.

8. The method according to claim 7, wherein the determining, according to the guard period configuration information of the first SP, whether to establish the guard period for the first SP comprises:
in response to the guard period configuration information being the first indication information, establishing the guard period for the first SP; or
in response to the guard period configuration information being the second indication information, and in response to a determination, according to the scheduling information of the adjacent network controller, that time and frequency overlapping exists between a second access period and the first SP, and it cannot be determined that the second access period causes no interference to the first SP, establishing the guard period for the first SP; or
in response to the guard period configuration information being the second indication information, and in response to a determination, according to the scheduling information of the adjacent network controller, that no time and frequency overlapping exists between a third SP and the first SP, skipping establishing the guard period for the first SP; or
in response to the guard period configuration information being the second indication information, and in response to a determination, according to the scheduling information of the adjacent network controller, that time and frequency overlapping exists between a second access period and the first SP, and it cannot be determined that the second access period causes no interference to the first SP, establishing the guard period for the first SP.

9. The method according to claim 7, wherein the first indication information comprises any one of third indication information, or fourth indication information, or fifth indication information, and wherein the establishing the guard period for the first SP comprises:
in response to the first indication information of the first SP being the third indication information, establishing the guard period only on a current working channel; or
in response to the first indication information of the first SP being the fourth indication information and a station works on a small-bandwidth channel, establishing the guard period on a current working small-bandwidth channel of the station, and establishing the guard period on a large-bandwidth channel whose frequency overlaps with a current working small-bandwidth frequency; or
in response to the first indication information of the first SP being the fourth indication information and the station works on a large-bandwidth channel, establishing the guard period on a current working large-bandwidth channel of the station, and establishing the guard period on a low-frequency small-bandwidth channel whose frequency overlaps with a frequency of the current working large-bandwidth channel; or in response to the first indication information of the first SP being the fifth indication information, establishing the guard period on a current working large-bandwidth channel, and establishing the guard period on a high-frequency small-bandwidth channel whose frequency overlaps with a frequency of the current working large-bandwidth channel.

10. The method according to claim 9, wherein the establishing the guard period on a current working large-bandwidth channel of the station, and establishing the guard period on a low-frequency small-bandwidth channel whose frequency overlaps with a frequency of the current working large-bandwidth channel comprises:

listening on the current working large-bandwidth channel of the station;

in response to both a physical layer carrier sensing (CS) result and a virtual carrier sensing result showing that the current working large-bandwidth channel of the station is idle, performing RTS/DMG CTS handshake on the current working large-bandwidth channel of the station; and performing RTS/DMG CTS handshake on the low-frequency small-bandwidth channel whose frequency overlaps with the frequency of the current working large-bandwidth channel.

11. The method according to claim 9, wherein the establishing the guard period on a current working large-bandwidth channel, and establishing the guard period on a high-frequency small-bandwidth channel whose frequency overlaps with a frequency of the current working large-bandwidth channel comprises:

listening on the current working large-bandwidth channel of the station;

in response to both a physical layer carrier sensing (CS) result and a virtual carrier sensing result showing that the current working large-bandwidth channel of the station is idle, performing RTS/DMG CTS handshake on the current working large-bandwidth channel of the station; and performing RTS/DMG CTS handshake on the high-frequency small-bandwidth channel whose frequency overlaps with the frequency of the current working large-bandwidth channel.

12. A non-transitory computer-readable storage medium comprising instructions which, when executed by a computer, cause the computer to carry out the method of claim 7.

13. A network controller, comprising:

a receiver, configured to acquire scheduling information of an adjacent network controller of a first network controller, wherein scheduling information of a network controller comprises an identifier of an access period scheduled by the corresponding network controller, and a start time and duration of the access period corresponding to the identifier of the access period, wherein the access period comprises a service period (SP) and a contention-based access period (CBAP);

a processor configured to determine, according to scheduling information of the first network controller and the scheduling information, acquired by receiver, of the adjacent network controller, a status of time and frequency overlapping between a first SP and another access period, except the first SP, scheduled by the first network controller and the adjacent network controller, wherein the processor is further configured to set guard period configuration information of the first SP according to a pre-acquired interfered status of the first SP and the status, determined by the processor, of time and frequency overlapping between the first SP and the other access period, except the first SP, scheduled by the first network controller and the adjacent network controller, wherein the guard period configuration information comprises first indication information or second indication information, wherein the first indication information is used to indicate that a guard period needs to be established for the first SP, and wherein the second indication information is used to indicate that the guard period is allowed to be established for the first SP; and a transmitter, configured to send the guard period configuration information, configured by the processor, of the first SP to a source station and a destination station of the first SP, so that the source station and the destination station of the first SP determine, according to the guard period configuration information of the first SP, whether to establish the guard period for the first SP.

14. The network controller according to claim 13, wherein the processor being further configured to set the guard period configuration information of the first SP according to the pre-acquired interfered status of the first SP and the status, determined by the processor, of time and frequency overlapping between the first SP and the other access period, except the first SP, scheduled by the first network controller and the adjacent network controller comprises:

in response to the processor determining that time and frequency overlapping exists between a first access period and the first SP in the other access period, except the first SP, scheduled by the first network controller and the adjacent network controller, and cannot determine, according to the pre-acquired interfered status of the first SP, that the first access period causes no interference to the first SP, setting the guard period configuration information of the first SP to the first indication information; or in response to the processor determining that no time and frequency overlapping exists between a first access period and the first SP in the other access period, except the first SP, scheduled by the first network controller and the adjacent network controller, setting the guard period configuration information of the first SP to the second indication information; or in response to the processor determining that time and frequency overlapping exists between a first access period and the first SP in the other access period, except the first SP, scheduled by the first network controller and the adjacent network controller, and determines, according to the pre-acquired interfered status of the first SP, that the first access period causes no interference to the first SP, setting the guard period configuration information of the first SP to the second indication information.

15. The network controller according to claim 14, wherein the scheduling information further comprises an allocation type of the access period, and the allocation type indicates a type of the access period and an allocated channel, wherein the first indication information comprises any one of third indication information, or fourth indication information, or fifth indication information, so that the source station and the destination station of the first SP determine, according to the first indication information of the first SP, a channel on which the guard period established, and wherein the processor being further configured to set the guard period configuration information of the first SP to the first indication information comprises:

in response to a determination that a channel of the first SP is the same as a channel of the first access period, setting the first indication information of the first SP to the third indication information, wherein the third indication information is used to instruct the source station and the destination station of the first SP to establish the guard period only on a current working channel; or in response to a determination that a channel of the first SP is a small-bandwidth channel, and a channel of the first access period is a large-bandwidth channel whose frequency overlaps with a frequency of the small-bandwidth channel of the first SP, setting the first indication information of the first SP to the fourth indication information, wherein the fourth indication information is used to instruct the source station and the destination station of the first SP to establish the guard period on a current working small-bandwidth channel, and establish the guard period on a large-bandwidth channel whose frequency overlaps with a current working small-bandwidth frequency; or in response to a determination that a channel of the first SP is a large-bandwidth channel, and a channel of the first access period is a low-frequency small-bandwidth channel whose frequency overlaps with a frequency of the large-bandwidth channel of the first SP, setting the first indication information of the first SP to the fourth indication information, wherein the fourth indication information is used to instruct the source station and the destination station of the first SP to establish the guard period on a current working large-bandwidth channel, and establish the guard period on a low-frequency small-bandwidth channel whose frequency overlaps with a frequency of the current working large-bandwidth channel; or in response to a determination that a channel of the first SP is a large-bandwidth channel, and a channel of the first access period is a high-frequency small-bandwidth channel whose frequency overlaps with a frequency of the large-bandwidth channel of the first SP, setting the first indication information of the first SP to the fifth indication information, wherein the fifth indication information is used to instruct the source station and the destination station of the first SP to establish the guard period on a current working large-bandwidth channel, and establish the guard period on a high-frequency small-bandwidth channel whose frequency overlaps with a frequency of the current working large-bandwidth channel.

16. The network controller according to claim 13, wherein the receiver is further configured to:

receive the scheduling information sent by the adjacent network controller of the first network controller; or receive interference report information that is sent, by using a cluster report or a DMG service specification element, by a station within a basic service set BSS in which the first network controller is located; and acquire the scheduling information of the adjacent network controller according to the interference report information.

17. The network controller according to claim 14, wherein, in response to a determination that guard periods need to be established for SPs that are respectively allocated to a first pair of stations and a second pair of stations, according to an allocation status of the SPs corresponding to the first pair of stations and the second pair of stations, the processor is further configured to:

set directional channel quality measurement request elements and send the directional channel quality measurement request elements to the first pair of stations and the second pair of stations respectively, so that directional channel quality measurement time periods indicated by the directional channel quality measurement request elements of the first pair of stations and the second pair of stations can cover listening mode time periods at start times of the corresponding SPs, and further the first pair of stations and the second pair of stations respectively point receive antennas to peer stations according to the directional channel quality measurement request elements; and complete directional channel quality measurement while channel listening required for establishing the guard periods is complete within the corresponding SPs.

18. A station, comprising:

a receiver, configured to:

receive scheduling information sent by an adjacent network controller of a first network controller, wherein the scheduling information of the adjacent network controller comprises an identifier of an access period scheduled by the adjacent network controller, a start time and duration of the access period corresponding to the identifier of the access period, and a channel type of the access period, wherein the access period comprises a service period (SP) and a contention-based access period (CBAP); and receive guard period configuration information, sent by a first network controller, of a first SP, wherein the guard period configuration information comprises first indication information or second indication information, wherein the first indication information is used to indicate that a guard period needs to be established for the first SP, and wherein the second indication information is used to indicate that the guard period is allowed to be established for the first SP; and a processor, configured to determine, according to the guard period configuration information, received by the receiver, of the first SP, whether to establish the guard period for the first SP: and a transmitter, configured to send interference report information to the first network controller by using a cluster report or a DMG service specification element, wherein the interference report information comprises the scheduling information sent by the adjacent network controller.

19. The station according to claim 18, wherein the processor is further configured to:

establish the guard period for the first SP in response to the guard period configuration information being the first indication information; or establish the guard period for the first SP in response to the guard period configuration information being the second indication information, and in response to a determination, according to the scheduling information of the adjacent network controller, that time and frequency overlapping exists between a second access period and the first SP, and it cannot be determined that the second access period causes no interference to the first SP; or skip establishing the guard period for the first SP in response to the guard period configuration information being the second indication information, and in response to a determination, according to the scheduling information of the adjacent network controller, that no time and frequency overlapping exists between a third SP and the first SP; or establish the guard period for the first SP in response to the guard period configuration information being the second indication information, and in response to a determination, according to the scheduling information of the adjacent network controller, that time and frequency overlapping exists between a second access period and the first SP, and it cannot be determined that the second access period causes no interference to the first SP.

20. The station according to claim 18, wherein the first indication information comprises any one of third indication information, or fourth indication information, or fifth indication information, and wherein the processor being configured to establish the guard period for the first SP comprises:

in response to the first indication information of the first SP being the third indication information, establishing the guard period only on a current working channel; or in response to the first indication information of the first SP being the fourth indication information and the station works on a small-bandwidth channel, establishing the guard period on a current working small-bandwidth channel of the station, and establishing the guard period on a large-bandwidth channel whose frequency overlaps with a current working small-bandwidth frequency; or in response to the first indication information of the first SP being the fourth indication information and the station works on a large-bandwidth channel, establishing the guard period on a current working large-bandwidth channel of the station, and establishing the guard period on a low-frequency small-bandwidth channel whose frequency overlaps with a frequency of the current working large-bandwidth channel; or in response to the first indication information of the first SP being the fifth indication information, establishing the guard period on a current working large-bandwidth channel, and establishing the guard period on a high-frequency small-bandwidth channel whose frequency overlaps with a frequency of the current working large-bandwidth channel.

21. The station according to claim 20, wherein the processor establishing the guard period on the current working large-bandwidth channel of the station, and establishing the guard period on the low-frequency small-bandwidth channel whose frequency overlaps with the frequency of the current working large-bandwidth channel comprises:

listening on the current working large-bandwidth channel of the station;

in response to both a physical layer carrier sensing (CS) result and a virtual carrier sensing result showing that the current working large-bandwidth channel of the station is idle, performing RTS/DMG CTS handshake on the current working large-bandwidth channel of the station; and performing RTS/DMG CTS handshake on the low-frequency small-bandwidth channel whose frequency overlaps with the frequency of the current working large-bandwidth channel.

22. The station according to claim 20, wherein the processor establishing the guard period on the current working large-bandwidth channel, and establishing the guard period on the high-frequency small-bandwidth channel whose frequency overlaps with the frequency of the current working large-bandwidth channel comprises:

listening on the current working large-bandwidth channel of the station;

in response to both a physical layer carrier sensing (CS) result and a virtual carrier sensing result showing that the current working large-bandwidth channel of the station is idle, performing RTS/DMG CTS handshake on the current working large-bandwidth channel of the station; and performing RTS/DMG CTS handshake on the high-frequency small-bandwidth channel whose frequency overlaps with the frequency of the current working large-bandwidth channel.

* * * * *

UNITED STATES PATENT AND TRADEMARK OFFICE
CERTIFICATE OF CORRECTION

PATENT NO. : 10,117,105 B2  
APPLICATION NO. : 15/199597  
DATED : October 30, 2018  
INVENTOR(S) : Dejian Li Page 1 of 1

It is certified that error appears in the above-identified patent and that said Letters Patent is hereby corrected as shown below:

In the Claims

In Column 64, Line 16, Claim 3, delete "further further" and insert --further--.

In Column 70, Lines 46-47, Claim 18, delete "guard period for the first SP: and" and insert --guard period for the first SP; and--.

Signed and Sealed this  
Twenty-ninth Day of January, 2019

Andrei Iancu  
*Director of the United States Patent and Trademark Office*